(12) United States Patent
Ravelo

(10) Patent No.: US 12,545,050 B2
(45) Date of Patent: Feb. 10, 2026

(54) ADAPTIVE WHEEL ASSEMBLY WITH INTERCHANGEABLE DECORATIVE FACES

(71) Applicant: Michael Ravelo, Spokane, WA (US)

(72) Inventor: Michael Ravelo, Spokane, WA (US)

(*) Notice: Subject to any disclaimer, the term of this patent is extended or adjusted under 35 U.S.C. 154(b) by 0 days.

(21) Appl. No.: 18/532,540

(22) Filed: Dec. 7, 2023

(65) Prior Publication Data

US 2024/0149612 A1 May 9, 2024

Related U.S. Application Data

(60) Continuation of application No. 17/330,030, filed on May 25, 2021, now Pat. No. 11,850,888, which is a division of application No. 16/918,797, filed on Jul. 1, 2020, now Pat. No. 11,021,011, which is a continuation-in-part of application No. PCT/US2020/012094, filed on Jan. 2, 2020.

(60) Provisional application No. 62/787,583, filed on Jan. 2, 2019.

(51) Int. Cl.
| | |
|---|---|
| *B60B 7/06* | (2006.01) |
| *B60B 7/04* | (2006.01) |
| *B60B 7/14* | (2006.01) |
| *B60B 3/10* | (2006.01) |

(52) U.S. Cl.
CPC ............... *B60B 7/066* (2013.01); *B60B 7/04* (2013.01); *B60B 7/063* (2013.01); *B60B 7/14* (2013.01); *B60B 3/10* (2013.01); *B60B 2900/513* (2013.01); *B60B 2900/571* (2013.01)

(58) Field of Classification Search
CPC ........... B60B 7/01; B60B 7/063; B60B 7/066; B60B 7/04; B60B 7/14; B60B 3/10; B60B 2900/513; B60B 2900/571
See application file for complete search history.

(56) References Cited

U.S. PATENT DOCUMENTS

| | | | |
|---|---|---|---|
| 5,090,777 A | 2/1992 | Li | |
| 5,346,288 A * | 9/1994 | Hodge | B60B 7/02 301/37.35 |
| 5,358,313 A | 10/1994 | Polka | |

(Continued)

FOREIGN PATENT DOCUMENTS

| | | |
|---|---|---|
| AU | 2008203093 A1 | 1/2010 |
| CN | 204149763 U | 2/2015 |

(Continued)

OTHER PUBLICATIONS

Office Action for Japanese Patent Application No. 2022-066030 mailed Nov. 12, 2024. (6 pages).

(Continued)

*Primary Examiner* — Kip T Kotter
(74) *Attorney, Agent, or Firm* — Seed Intellectual Property Law Group LLP

(57) ABSTRACT

A wheel assembly that provides a simulated center lock wheel look that also enables exchanging of ornamental face plates with a center hub attachment device that will allow car enthusiasts to easily change the look of their automotive wheels while maintaining a center lock wheel appearance. The assembly includes three components: a base wheel, a plurality of ornamental face plates, and a center hub attachment extending from one of either the hub or the ornamental face plate.

18 Claims, 40 Drawing Sheets

(56) References Cited

U.S. PATENT DOCUMENTS

| | | |
|---|---|---|
| 5,464,277 A | 11/1995 | Redd |
| 5,845,972 A | 12/1998 | Baker |
| 7,669,940 B2 | 3/2010 | Diko |
| 9,327,550 B2 | 5/2016 | Butler et al. |
| 9,393,833 B2 | 7/2016 | Vickers et al. |
| 11,021,011 B2 | 6/2021 | Ravelo |
| 2003/0047987 A1 | 3/2003 | Enomoto et al. |
| 2005/0179311 A1 | 8/2005 | Barney |
| 2009/0026832 A1 | 1/2009 | Baumgartner |
| 2009/0278398 A1 | 11/2009 | Diko |
| 2010/0181821 A1* | 7/2010 | Noriega ............. B60B 7/0013 301/37.35 |
| 2011/0089748 A1 | 4/2011 | Grill et al. |
| 2011/0116279 A1 | 5/2011 | Lin |
| 2012/0007415 A1 | 1/2012 | McCorry et al. |
| 2012/0043803 A1 | 2/2012 | Grill et al. |
| 2014/0152078 A1 | 6/2014 | Noriega |
| 2014/0265533 A1 | 9/2014 | Polka |
| 2016/0046146 A1 | 2/2016 | Wohlfarth et al. |
| 2016/0368315 A1 | 12/2016 | Nunes et al. |
| 2017/0282642 A1 | 10/2017 | Wang |
| 2018/0319209 A1 | 11/2018 | Chung |
| 2019/0283494 A1 | 9/2019 | Shadravan |
| 2021/0283947 A1* | 9/2021 | Walser ............. B60B 7/063 |

FOREIGN PATENT DOCUMENTS

| | | |
|---|---|---|
| DE | 10 2010 032 429 A1 | 3/2011 |
| DE | 10 2014 000 089 A1 | 7/2015 |
| EP | 2 726 302 | 1/2013 |
| ES | 2633037 A1 | 9/2017 |
| JP | 59-147603 U | 10/1984 |
| JP | S59147603 U | 10/1984 |
| JP | 11-11102 A | 1/1999 |
| JP | 2003-80901 A | 3/2003 |
| JP | 2003-159901 A | 6/2003 |
| JP | 2014-518363 A | 7/2014 |
| JP | 2016-37061 A | 3/2016 |
| WO | 2013/005008 A1 | 1/2013 |
| WO | 2015/104213 A1 | 7/2015 |

OTHER PUBLICATIONS

Final Rejection, mailed Nov. 12, 2024, for Japanese Patent Application No. 2022-066030, 6 pages.

* cited by examiner

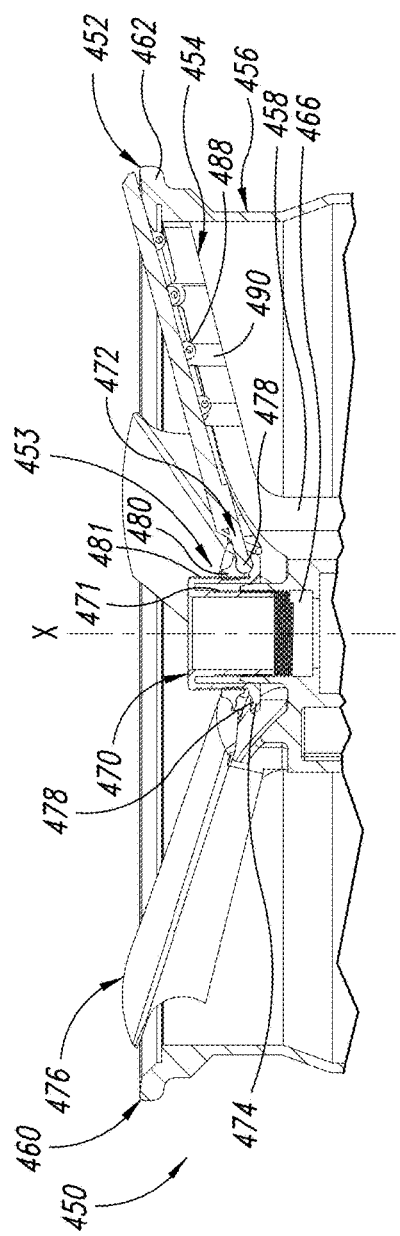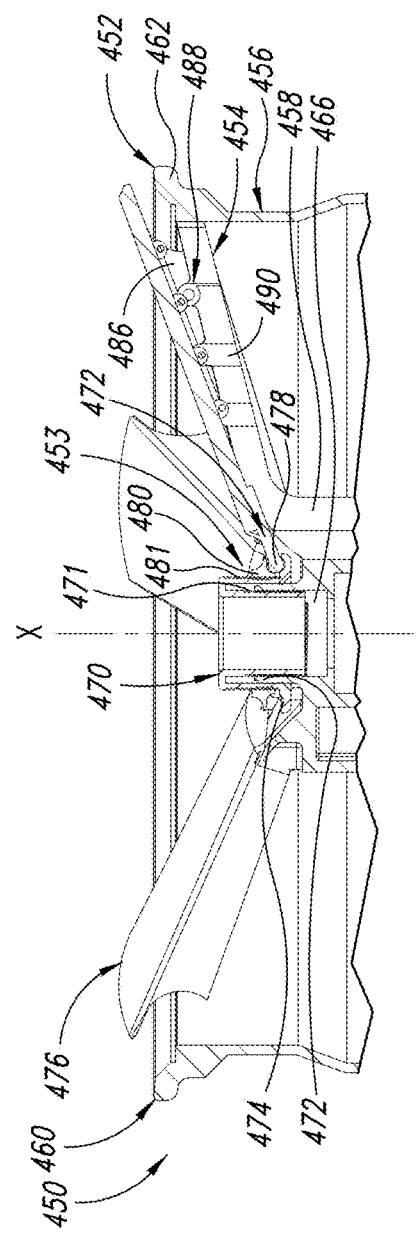
FIG. 33A
FIG. 33B

ADAPTIVE WHEEL ASSEMBLY WITH INTERCHANGEABLE DECORATIVE FACES

BACKGROUND

Technical Field

The present disclosure pertains to wheels and, more particularly, to a wheel system for vehicles that provides for a base wheel and an adaptive attachment of interchangeable decorative wheel faces.

Description of the Related Art

The automotive wheel industry continues to be an integral part of automotive design, functionality, and customization. The idea of the integrated wheel arises from the opportunity to incorporate the full use of the wheel that is fully customizable by the consumer. The automotive wheel market has to meet stronger governmental standards amidst balancing changing consumer styling trends and demands. The current wheel market is a multi-billion dollar industry dominated by the OEM end-user which is compounded by the aftermarket end-user. Innovation in this segment is becoming increasingly vital given the need to decrease unsprung weight or rotational mass while keeping desirable aesthetic properties.

BRIEF SUMMARY

The present disclosure is directed to an integrated wheel design and structure that takes full advantage of all aspects of the wheel, allowing for the ability to maximize offset, concavity, diameter, and reduction of weight to maximize circular velocity in certain applications. The present disclosure reduces manufacturing cost without sacrificing the desirable ornamental properties. In fact, it exponentially increases the ornamental design capabilities, thus allowing for both the OEM and consumer or end-user to keep up with trends without costly re-investment.

In accordance with another aspect of the present disclosure, a multi-piece wheel assembly is provided that incorporates an adaptive hub attachment that also enables exchanging of ornamental faces or the hub itself. This assembly will allow car enthusiasts to easily change the look of their automotive wheels. The adaptive hub attachment can simulate the appearance of a center lock wheel appearance or be incorporated into the design of the wheel itself. The assembly, in one implementation, has a base wheel designed to support the ornamental face, a replaceable ornamental face plate, and an attachment assembly to attach the ornamental face plate to the base wheel.

In accordance with another aspect of the present disclosure, a three-piece wheel assembly is provided that provides a simulated center lock wheel look that also enables exchanging of an ornamental center hub attachment. This assembly will allow car enthusiasts to easily change the look of their automotive wheels while maintaining a center lock wheel appearance.

The assembly, in one implementation, has a base wheel, a replaceable ornamental face plate, and an attachment assembly to attach the ornamental face plate to the base wheel.

In accordance with another aspect of the present disclosure, the wheel assembly includes three components: a base wheel, a center lug conversion, and at least one (and preferably more than one) interchangeable center hub attachment or ornamental face plate.

In accordance with another aspect of the present disclosure, the base wheel includes a standard five-lug attachment although it can accommodate a 4-lug or even a 1-lug configuration, and it can include in one implementation a deep offset to provide as much exterior space for a variety of attachments. The base wheel will have as little material as possible for weight reduction. It can employ multiple designs centered on light weight strength and stability, including without limitation, thin spokes and spokes having a more blade-like shape.

In accordance with yet a further aspect of the present disclosure, the adaptive center lug conversion device is attached to the center hub of the base wheel from the back and extends outward. The adaptive hub center lug conversion device is for appearance only and does not bear the weight of the vehicle.

In accordance with still yet another aspect of the present disclosure, the center hub attachment or ornamental face plate differs from a hubcap, beauty rim, or wheel cover as it moves away from conventional methods of producing decorative faces and attachment points. The ornamental face takes advantage of the base wheel and its attributes to cover only as much as required to achieve the desired design. This allows the design to keep open areas that can expose the brake system and still maintain the look of a true wheel. The hub cap or beauty rim also adheres to the wheel in one plane, which differs drastically from the aforementioned face that incorporates a design traversing multiple planes. It also differs from a typical wheel currently using the end ornamental design as the weight bearing surface. The new ornamental face is integrated into the base wheel providing structure and uniformity to the ornamental face. By integrating the ornamental face to the base wheel it provides a stable attachment to not only composite material but also metal faces. It attaches to the center lug conversion device using a secure locking mechanism. It fits into the base wheel and can use the existing space and structures such as lug nuts as internal stabilization points.

In accordance with still yet another aspect of the present disclosure, the center hub attachment or ornamental face plate is similar to a hubcap, beauty rim, or wheel cover that is decorative only. It attaches to the center lug conversion device using a secure locking mechanism. By allowing center attachment, the weight and design of the ornamental faces can dramatically increase compared to a typical hubcap or beauty ring. The base wheel design is integral in providing this support system to bear more weight and stabilize ornamental faces. The lockable center attachment is a secure attachment with good clamping force. Use of the center hub and base wheel structure will prevent movement and bear the outward centrifugal forces being applied. Use of a secure center attachment will (in conjunction with variations in center offsets) maintain most of the weight closer to the center of the barrel, alleviating weight disturbances in the wheel. Overall, the accessibility the center hub provides will allow interchangeability of ornamental faces with different designs. Designs that take advantage of the concavity of the wheel will be much easier to achieve and deliver better aesthetics, quality and appearance than any hub cap or beauty ring.

As will be readily appreciated from the foregoing, a variety of center hub attachments will give the user a choice and enable changing out the attachments at any time. The combination of the center lug conversion device and the center hub attachment provide the appearance of an authentic center lug wheel assembly by hiding the lug nuts of the vehicle if desired, although this is not necessary and the ornamental face could be designed to expose the lugs.

The base wheel and center hub combination allow for various adjustments to be made that will, in turn, affect the end design, having the ability to change the depth of the ornamental faces either by replacing solid faces or controlling the center hub to allow depth and angle variations. The ability to change the depth or angle will, in turn, add different design features. The ability of the center hub to accept different depth allows for axial movement. Adding a lock nut capable of housing independent ornamental faces or spokes onto the center hub adds the ability to change depth, and hence design, by moving the ornamental faces along the rotational axis of the center hub.

The integrative wheel technology disclosed herein merges both parties' interests. It accomplishes this by simplifying and dividing the current manufacturing process. A core base wheel design takes advantage of all aspects of the wheel. The integrative wheel advances design by moving away from the typical restrictions placed by the end ornamental design. Currently, the end design maintains the weight of the vehicle. Integration of the base wheel will sustain the weight of the vehicle. This would, in turn, not restrict the end-user's ability to freely change designs that are no longer tied to the weight bearing component. The base of the integrated wheel only incorporates the necessary material required to safely maintain the weight and exertional forces created by the vehicle. This can be accomplished by minimizing the design and distributing the material that attaches the hub/center of the wheel to the wheel barrel. If the distance of the hub/center is moved and a negative offset is incorporated, this would create a more useable surface area on the face of the wheel. Fabricating multiple attachment points from the center of the wheel distributes the weight carrying capacity of the wheel. The attachment points can have multiple designs and variations such as being slightly angled, creating a propeller-like spoke to maximize surface area and also to hide the rear portion of the base wheel. Varying the amount of material and distribution of the center will also allow for different ornamental designs to be applied to the end product. The base wheel attaches to the hub of the vehicle in conventional methods either by using a multi-lug attachment or a center lug attachment.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings, wherein:

FIGS. 33A-33C are cross-sectional illustrations of another implementation of a base wheel with an adjustable depth ornamental assembly at different stages of deployment formed in accordance with the present disclosure;

DETAILED DESCRIPTION

Figure 1:
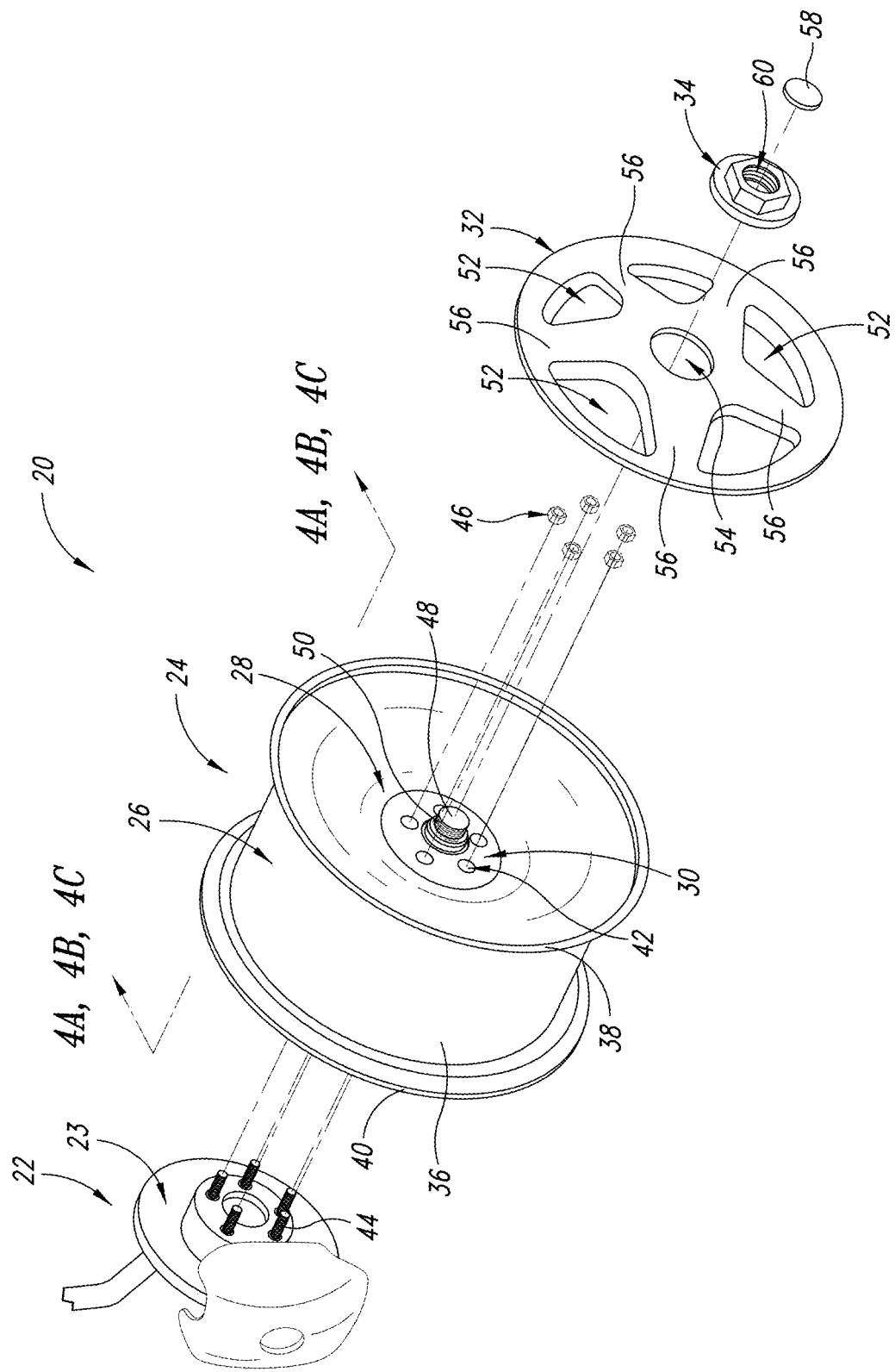
FIG. 1 is an exploded axonometric view of a wheel assembly formed in accordance with the present disclosure in combination with an existing brake rotor and wheel bearing hub assembly.

In the following description, certain specific details are set forth in order to provide a thorough understanding of various disclosed implementations. However, one skilled in the relevant art will recognize that the present disclosed implementations may be practiced without one or more of these specific details or with other methods, components, materials, etc. In other instances, well-known structures or components or both that are associated with the environment of the present disclosure have not been shown or described in order to avoid unnecessarily obscuring descriptions of the implementations. For example, these well-known structures or components include the structure and design of wheel spindles, axles, and the like to which a wheel and associated tire are mounted on a vehicle. Similarly, the tire to be mounted on the wheel assembly of the present disclosure is not illustrated or described herein in order to provide a clear and unobstructed view of the wheel assembly formed in accordance with the present disclosure.

Unless the context requires otherwise, throughout the specification and claims that follow, the word "comprise" and variations thereof, such as "comprises" and "comprising" are to be construed in an open inclusive sense, that is, as "including, but not limited to." The foregoing applies equally to the words "including" and "having."

Reference throughout this description to "one implementation" or "an implementation" means that a particular feature, structure, or characteristic described in connection with the implementation is included in at least one implementation. Thus, the appearance of the phrases "in one implementation" or "in an implementation" in various places throughout the specification are not necessarily all referring to the same implementation.

As used herein, the term "wheel" refers to a barrel having a center hub and at least one rim associated with it on which is mounted a tire, typically a pneumatic tire. Details concerning the association between the barrel, the rim, and the hub, such as the use of intermediate connection members, including without limitation spokes, are described in more detail hereinbelow. By way of general description, the wheel integration technology described herein simplifies and divides the current manufacturing process. A core base wheel design takes advantage of all aspects of the wheel. The base wheel advances design by moving away from the typical restrictions placed by the end ornamental design. Currently, the typical end design maintains the weight of the vehicle. The base wheel of the present disclosure will sustain the weight of the vehicle while not restricting the end-user's ability to freely change ornamental wheel face designs. The base wheel only utilizes the amount of material required to safely maintain the weight and the exertional forces created by the vehicle. This can be accomplished by minimizing the base wheel design and distributing the material that attaches the hub or center of the wheel to the wheel barrel. The base wheel provides integral support to the ornamental face by using surfaces on the posterior aspect that fit and sustain various portions of the ornamental face design. The base wheel and center hub provide the ability to have unsupported spokes or ornamental faces. This has the ability to drastically reduce overall end weight of the wheel as the unsupported structure only needs to have the desired design as it does not bare the weight of the vehicle. If the distance of the hub or center is moved so that a negative offset is obtained, this would create a more useable surface area on the face of the wheel. This surface area combined with the ability to quickly detach faces or spokes allows the end user to drastically change the overall end design of the ornamental face.

Fabricating multiple attachment points from the center of the wheel distributes the weight carrying capacity of the wheel. The attachment points can have multiple designs and variations such as being slightly angled creating a propeller like spoke to maximize surface area and also hide the rear portion of the base wheel. Varying the amount of material and distribution of the center will also allow for different ornamental designs to be applied to the end product. The integrated wheel attaches to the wheel rotor of the vehicle in conventional methods either by using a multi-lug attachment or a center lug attachment.

The center of the integrated wheel utilizes a unique attachment point. It can be incorporated into the initial manufacturing process of the wheel or united to the base wheel. This center attachment point creates the integral part of the base wheel. The center attachment point allows for a secure method to attach different ornamental surfaces to the base wheel. This is accomplished with a fastener-type screw-on cap and coupling attachment for both safety and ability to quickly release and change the ornamental face plate. In the case of the multi-lug hub, low profile lug nuts are used to attach the base wheel. In this case the ornamental surface can be designed to multiple different specifications.

The different ornamental face plate designs can hide the lugs if desired to thereby create a center lug wheel look. The center lug wheel incorporates the center attachment point either from the hub attachment itself (if the vehicle uses a hub-type conversion to a center lug) or secures to the center lug creating the same ability to secure ornamental face plates. The center cap and attachment component allows space for a locking mechanism to protect the ornamental face plate and wheel from theft. This also adds another layer of safety. The ornamental face plate will have a backing with minor ridges and distal insertion points at the wheel barrel that match the base wheel. The distal ridges or insertion may be used if required to stabilize the ornamental face plate during high revolution or wind interference. This would be implemented primarily for properly securing the distal edges of the face (spokes) especially when using more flexible composite material.

Another aspect of the present disclosure is the ability to change the depth of the ornamental face and ornamental spokes inside the barrel of the wheel. This differs from a typical hub cap or beauty ring in the ability to cross different planes in the wheel barrel space. In addition, none of the prior designs can stay attached when there is distortion of the wheel to which they are attached. The structure of the present disclosure has a fixed attachment to a center attachment point on the base wheel, which means any distortion of the wheel barrel on the base wheel does not affect the attachment of the ornamental face to the base wheel.

Referring next to the drawings, FIG. 1 is an exploded axonometric view of a wheel assembly 20, formed in accordance with the present disclosure, positioned adjacent an existing vehicle bearing hub 22 that includes a vehicle rotor 23.

In this implementation, the wheel assembly 20 includes a base wheel 24 formed of a barrel portion 26 and a centrally located wheel hub 28 in the interior of the barrel portion 26. The wheel hub 28 includes a center attachment point 30 to which can be attached one from among a plurality of different ornamental face plates 32 using a threaded fastener 34, which when combined form the wheel assembly 20.

The barrel portion 26 of the base wheel 24 includes the cylindrical-shaped barrel 36 having an annular exterior rim 38 and an annular interior rim 40 formed around the exterior and interior perimeters, respectively, of the cylindrical-shaped barrel 36. The wheel hub 28 in this implementation is solid from the exterior rim 38 to the point where it meets the center attachment point 30. In other words, it is dished in appearance and devoid of openings such as slots, and has no spokes, blades, or the like. However, it is to be understood that other configurations may be used for the wheel hub 28, including spoked, bladed, slotted, and variations thereof for weight reduction (to sustain the weight of the vehicle and create windows to allow for visualization of braking components and cooling). The size, shape, and placement of the same features may also be dictated by ornamental design considerations and to appeal to consumers based on latest styles and trends. Although the weight of the base wheel 24 is preferably as light as possible, removal of material to achieve lighter weight may still be done, with or without deference to appearance, cosmetic appeal, and latest ornamental trends and consumer preferences.

The center attachment point 30 may be integrally formed with the wheel hub 28, such as in the forging stage, or welded in place during fabrication, or it may be removably attached to the wheel hub 28 using conventional attachment methods that are readily commercially available and will not be described in detail herein. The center attachment point 30 includes five openings 42 sized and shaped to receive five mounting lugs 44 projecting from the vehicle rotor 23. Five lug nuts 46 are shown for threadable engagement with the five mounting lugs 44 to hold the base wheel 24 in place on the vehicle rotor 23 in a conventional manner. (Shown five lug configuration but one or more lugs could be used.) Extending from the center attachment point 30 is a threaded post 48 having exterior threads 50. In some implementations, the post may have a hollow internally threaded axial bore with a smooth exterior surface, a threaded exterior surface with smooth internal bore, or the exterior surface may be threaded in combination with internal threads on the internal axial bore. The threads may be right-handed or left-handed oriented threads, depending on the direction of rotation of the wheel assembly 20 when mounted on the vehicle.

This post, because of where it is located at the center of the hub and its purpose built construction, can hold varying amount of weight securely and safely. For example it can hold larger heavy metal faces but will not flex or contort under forces like a hub cap.

The ornamental face plate 32 shown in FIG. 1 is one form of a center attachment device and, in this implementation, it is shown having one of many different ornamental configurations. As shown in this example, the ornamental face plate 32 has openings 52 formed around a central opening 54 to create five ornamental radial spokes 56. The ornamental face plate 32 has a disc shape with a circular planform shape that is sized and shaped to fit within the exterior rim 38 of the base wheel 24. The central opening 54 itself is sized and shaped to be slidably received over the threaded post 48 on the center attachment point 30, where it is held in place by the threaded fastener 34. A decorative plug or cover 58 can be inserted in a central opening 60 of the threaded fastener 34 to create a finished appearance. The plug or cover 58 can be held in place with an interference fit, or for more security it can be threaded on to the post 48. As shown in the assembled view of FIG. 2, when the ornamental face plate 32 is mounted to the post 48, it will preferably cover the five lug nuts 46, blocking them from exterior view.

Figure 2:
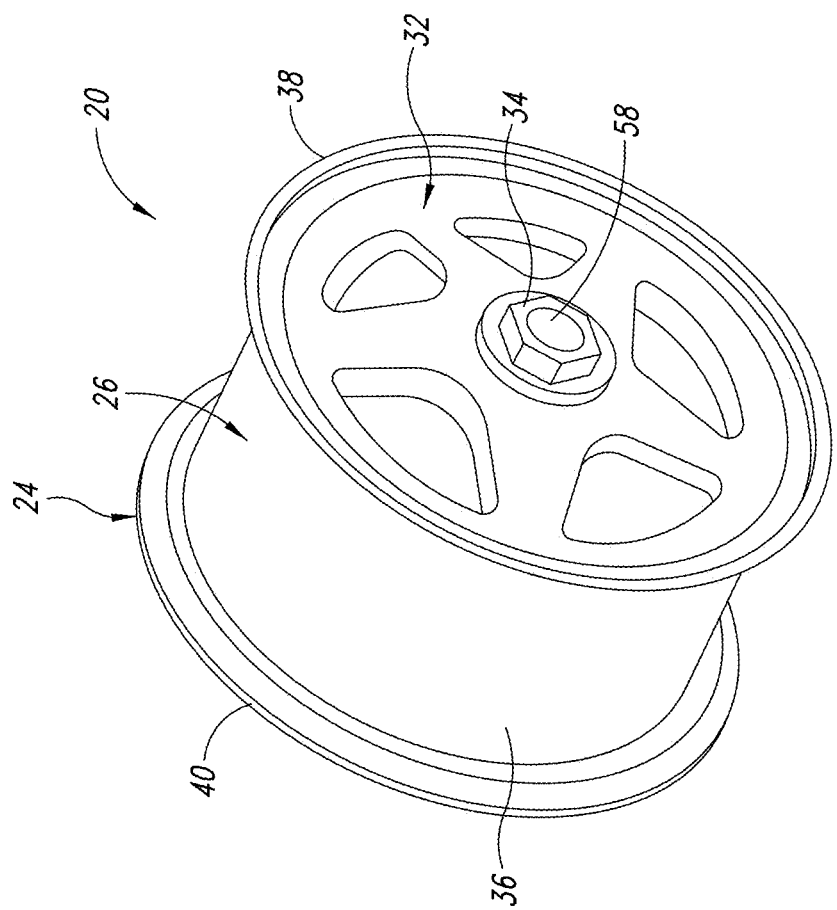
FIG. 2 is an axonometric view of the wheel assembly of FIG. 1 in assembled condition.
Figure 3:
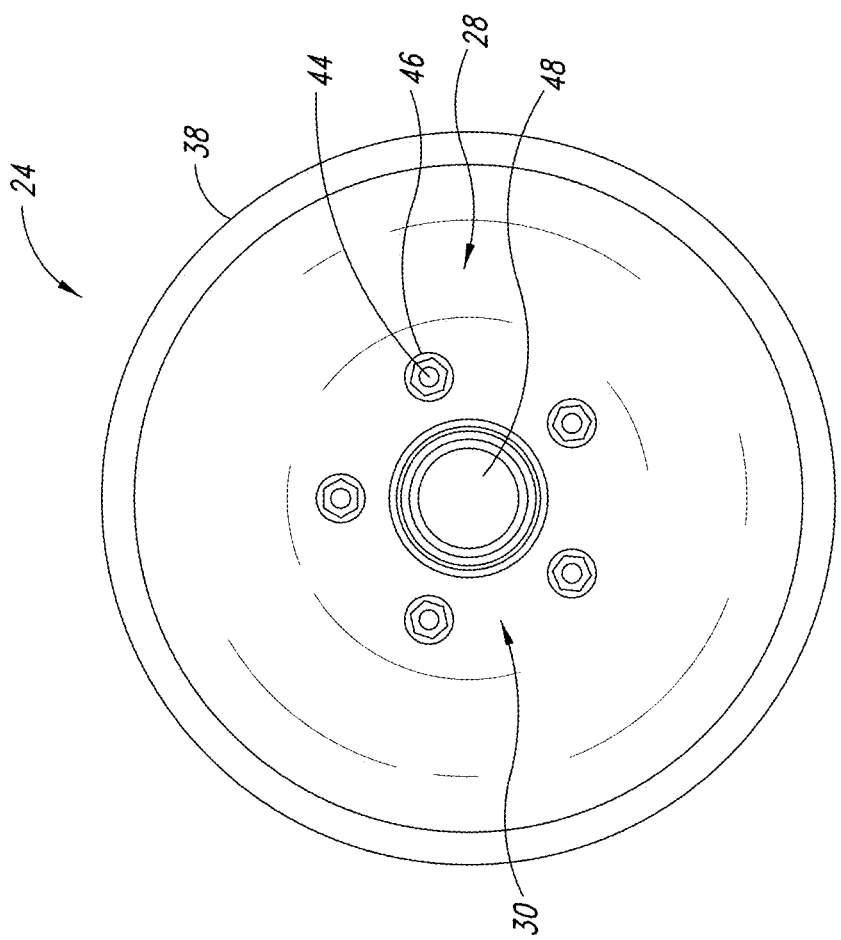
FIG. 3 is front elevational view of an alternative embodiment of a wheel and hub assembly of FIG. 1 without a decorative face where multiple circumferences can be accommodated to achieve different design appearances and qualities in accordance with the present disclosure.

FIG. 3 illustrates a first step in using the wheel assembly 20 of the present disclosure. Here the base wheel 24 is shown in a front elevational view attached to the vehicle rotor 23 (not shown in this view) using the five lug nuts 46 in a conventional manner. The next step is mounting an ornamental face plate 32 to the base wheel 24, such as the ornamental face plate 32 described above in connection with FIGS. 1 and 2. The ornamental face plate 32 is slid over the post 48 and held in place with the threaded fastener 34. The cover 58 is then positioned on the threaded fastener 34. The finished assembly is shown in FIG. 2. It is to be understood that this implementation is one of a number of variations in the structure, function, and appearance of the wheel assembly 20 of the present disclosure. For example, multiple circumferences can be accommodated where post 48 is stepped to accept larger diameter hubs such as on a heavy duty truck or smaller circumference to achieve different design qualities.

Figure 4:
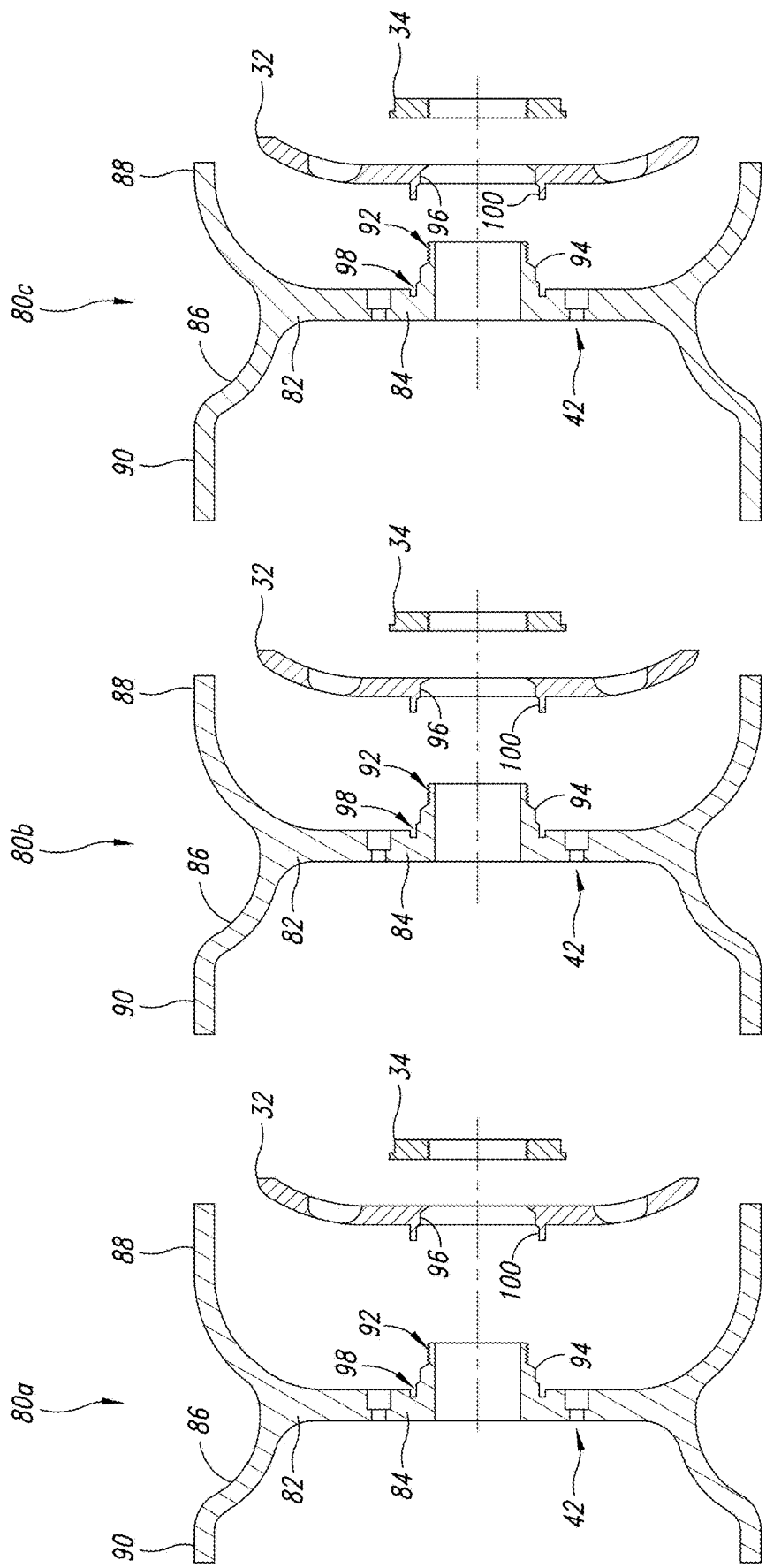
FIGS. 4A-4C are exploded cross-sectional views of wheel and hub assemblies showing three different positions of the hub relative to the barrel allowing for variations in concavity in the ornamental face in accordance with the present disclosure.

FIGS. 4A-4C are exploded cross-sectional views of wheel and hub assemblies 80a, 80b, 80c showing three different positions of a center hub 82 and center attachment point 84 relative to a barrel portion 86. In FIG. 4A, the center hub 82 and center attachment point 84 are positioned more to the right of the lateral center of the barrel 86, i.e., towards the exterior rim 88, to give a negative offset to the wheel assembly 20. In FIG. 4C, the center hub 82 and center attachment point 84 are positioned more towards the left of the lateral center of the barrel portion 86, i.e., closer to the interior rim 90 than to the exterior rim 88, which gives a positive offset to the wheel assembly. This deep offset provides as much exterior space for a variety of attachments with variable concavity. In FIG. 4B, the center hub 82 and center attachment point 84 are positioned at substantially the location of the lateral midpoint of the barrel portion 86.

In the implementation shown in FIGS. 4A-4C, the center post 92 has an annular exterior shoulder 94 while the ornamental face plate 32 has an annular internal shoulder 96 sized and shaped to be slidably received over the center post 92 and into mating contact with the annular exterior shoulder 94 of the post 92. This aids in centering the ornamental face plate 32 on the post 92 and providing a secure slidable engagement to guide the ornamental face plate 32 on to the post 92. In addition, this shoulder feature aids in stabilizing the ornamental face plate 32 on the post 92, particularly during high-speed rotation of the wheel assemblies 80a, 80b, 80c. It is to be understood that post 92, shoulder 94, and an annular channel 98 (described below) can all vary in length and circumference to accommodate different variations of ornamental face plates 32.

In addition, the center attachment point 84 includes an annular channel 98 interior of the shoulder 94 that is sized and shaped to receive an annular collar 100 extending from an interior side of the ornamental face plate 32. When the ornamental face plate 32 is installed on the post 92 and slid onto the shoulder 94, the annular collar 100 will be slidably received inside the annular channel 98, providing more stability in the positioning of the ornamental face plate 32 during installation and use.

As will be readily appreciated from the foregoing, the base wheel is easier to manufacture and more simply reproducible than current decorative wheels. This only requires tooling modifications for offset, diameter and rigidity specifications and will decrease manufacturing costs. It also decreases the environmental footprint of the manufacturing process. The base wheel can apply multiple types of manufacturing processes such as forging, casting, multi-piece and flow-forming, amongst others, to achieve desired structural capabilities. Different types of materials can also be used, such as aluminum, magnesium, or composite type carbon fiber to create lightweight forms. Base wheel technology will essentially decrease the overall weight of the base wheel despite material or process used. This, in turn, will decrease unsprung weight in the wheel, enhancing performance/handling and improve fuel economy. If at any point it is desired to run the wheel at its lightest capability, then it only requires the end-user to remove the ornamentation and center attachment cap. The base wheel essentially uses the least amount of material to bear the weight of the vehicle; hence it is the lightest that can be produced safely. The base wheel allows for a cosmetically appealing, lightweight final product that still adheres to current designs while having the ability to add decorative features as desired. The base wheel is set apart by perpetuating these desirable design features, like the spacing of the base wheel attachment points (spokes) to visualize the caliper and rotor of a vehicle. This allows for desired visualization of these components and cooling of the braking system in the performance realm as well as aesthetics in the customization world.

The center attachment point on the wheel pushes the capability of customization to new levels. Using the base wheel as a springboard, the methodology of using the whole wheel creates new possibilities. Changing from a concave (negative) look offset to a more neutral or positive look is facilitated with the present disclosure. The locking mechanism can be removed and the cap untightened, to swap the ornamental face plate. Having the capability of changing the look of a wheel is a welcomed and overdue innovation in the automotive wheel realm. This integrated wheel technology drives the cost of creating easily interchangeable wheel faces down. This cuts down on waste and amount of product needed to create a whole new wheel. This also leads to the use of different types of materials to comprise the face of the wheel, such as composites or metals that usually require large amounts of machining to attain different finishes and colors.

Wheel integration technology has the potential to innovate multiple aspects of the automotive wheel market. The base wheel allows for the ability to easily swap and change faces, colors, and multiple designs can be placed on the base wheel. This is attained without having any load bearing surfaces. Customization can also be applied to the center lug/cap, incorporating different designs and colors. Different types of materials add flare to finishes, and composites play a vital role in weight reduction. This concept of interchangeability adds new dynamic to the wheel industry. Both the OEM and end-user benefit from this type of customization capability.

Figure 5:
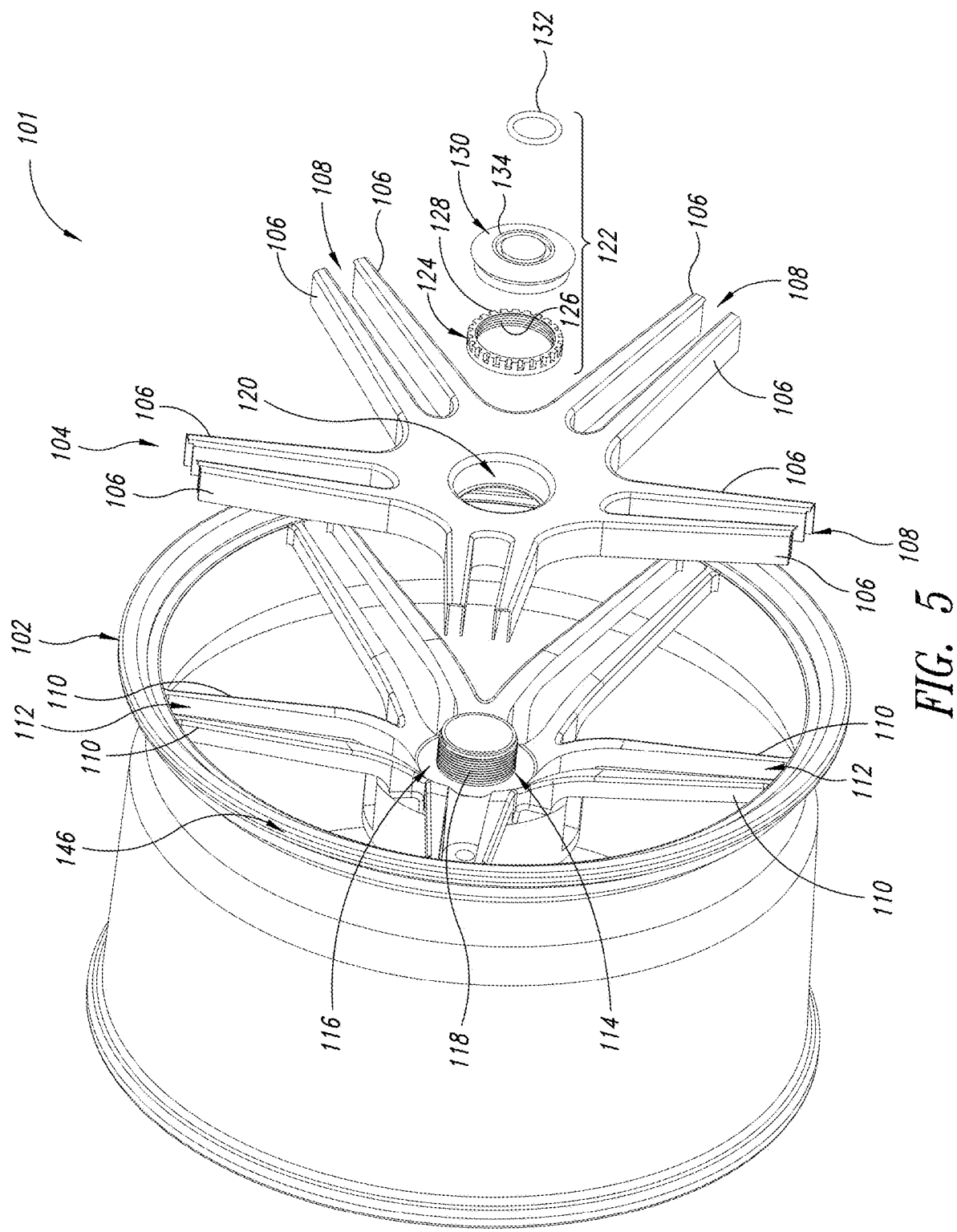
FIG. 5 is a fully exploded axonometric view of a wheel assembly having a 10-spoke ornamental face with open ended spokes arranged in five pairs of two, a 10-spoke wheel, and a center lock assembly.
Figure 6:
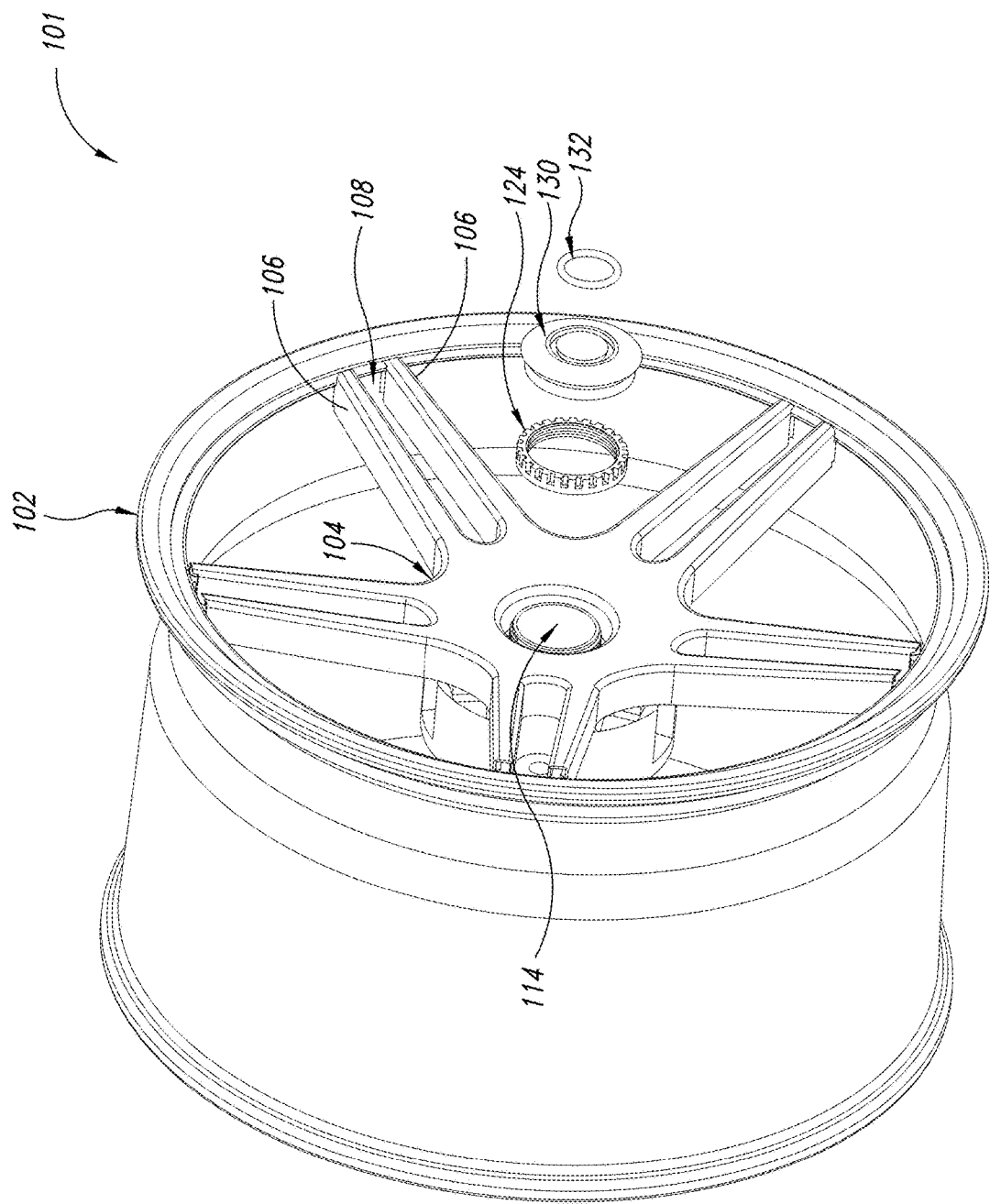
FIG. 6 is a partially exploded view of the assembled wheel and ornamental face of FIG. 5 with an exploded view of the lock assembly.

Referring next to FIGS. 5 and 6, shown therein is a basic, clean design of a wheel assembly 101 formed in accordance with the present disclosure to include a base wheel 102 and a removable ornamental face plate 104 that includes ten spokes 106 arranged in five pairs 108 of spokes spaced equidistantly around the circumference of the face plate 104. The wheel 102 has ten matching spokes 110 also arranged in five pairs 112 spaced equidistantly around the circumference of the wheel 102. The width of the desired base spoke can change to accommodate different ornamental faces or tolerate different weight tolerances.

FIG. 5 is an exploded view and FIG. 6 is a partially exploded view in which the ornamental face plate 104 is positioned on a post 114 extending from a center attachment point 116 of the wheel 102. The post 114 includes exterior threads 118 in this implementation. The face plate 104 has a center opening 120 that is sized and shaped to be slidably received over the post 114 without engaging the exterior threads 118. The face plate 104 is held in place on the wheel 102 with a center locking assembly 122 so that the spokes 106 of the face plate 104 are aligned with the spokes 110 of the wheel 102.

In this implementation, the center locking assembly 122 includes a king nut 124 having internal threads 126 sized and shaped to engage the exterior threads 118 of the wheel post 114. The outer exterior perimeter of the nut 124 is keyed with projections 128 to accept a similarly keyed socket (not shown) to provide security in the attachment of the face plate 104 to the wheel 102.

The center locking assembly 122 includes a center cap 130 sized and shaped to be received over the nut 124 and a sealing ring 132 that is sized and shaped to be received in a recess 134 in the cap 130. In accordance with one aspect of this implementation, the cap 130 has an annular interior collar with exterior threads, preferably reverse threads (dependent on the side of the vehicle), that threadably engage with interior reverse threads formed in a hollow interior of the wheel post 114. The recess 134 in the cap 130 is keyed to accept a tool for turning the cap 130 when the cap 130 is received on the wheel post 114. The sealing ring 132 is preferably formed of compliant material to enable insertion of the sealing ring 132 in the circular recess 134 with a tight fit.

FIG. 5 illustrates the adding of different ornamental designs to the base wheel. One advantage is one can add different designs to an ornamental face plate, but covering only the aspect that is needed to achieve the desired look. In this iteration there are open spaces or windows between the spokes, which differs from previous designs that are solid pieces. The ornamental face plates 106 can be any weight or material or color, to provide the ability to dramatically change the look and feel, and it can be unlocked and changed again. FIG. 6 illustrates the foregoing in more detail. In the partially assembled structure shown in FIG. 6, the spokes 106 on the ornamental face plate 104 are sized and shaped so the spokes 106 have an interior channel that receives the spokes of the wheel 102 in slidable engagement. This can be seen more clearly in FIG. 7, which is a partially exploded cross-sectional view of the assembled wheel 102 and ornamental face plate 104 of FIG. 6. In this implementation, the length of the spokes 106 is sized to enable the spokes 106 to extend up to but not touch the wheel 102.

Figure 7:
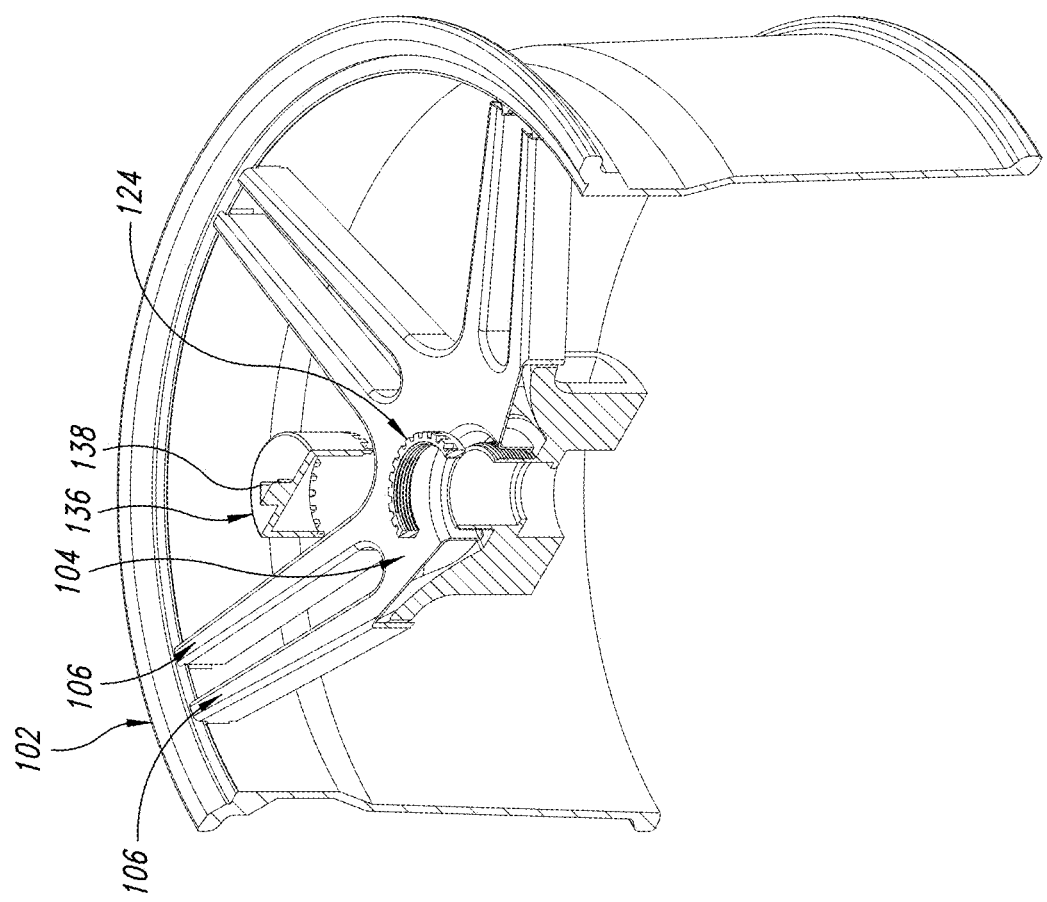
FIG. 7 is a partially exploded cross-sectional view of the assembled wheel and ornamental face of FIG. 6 with an exploded view of an alternative lock assembly.

FIG. 7 shows an exploded view of a keyed socket 136 to be received over the king nut 124 with the projections 128 on the king nut engaged with mating slots (not shown) in the socket 136. The socket 136 also includes a projection 138 that is keyed to receive a similarly keyed tool (not shown), such as a conventional socket tool. The socket 136 does not remain on the king nut 124, and it is used only for installing and removing the king nut 124. The king nut can also move up and down the hub holding various thickness of material of the ornamental face attachment. The king nut can incorporate another attachment point for independent ornamental spokes and move along the access of the center hub varying depth and concavity (demonstrated in later figures).

Figure 8:
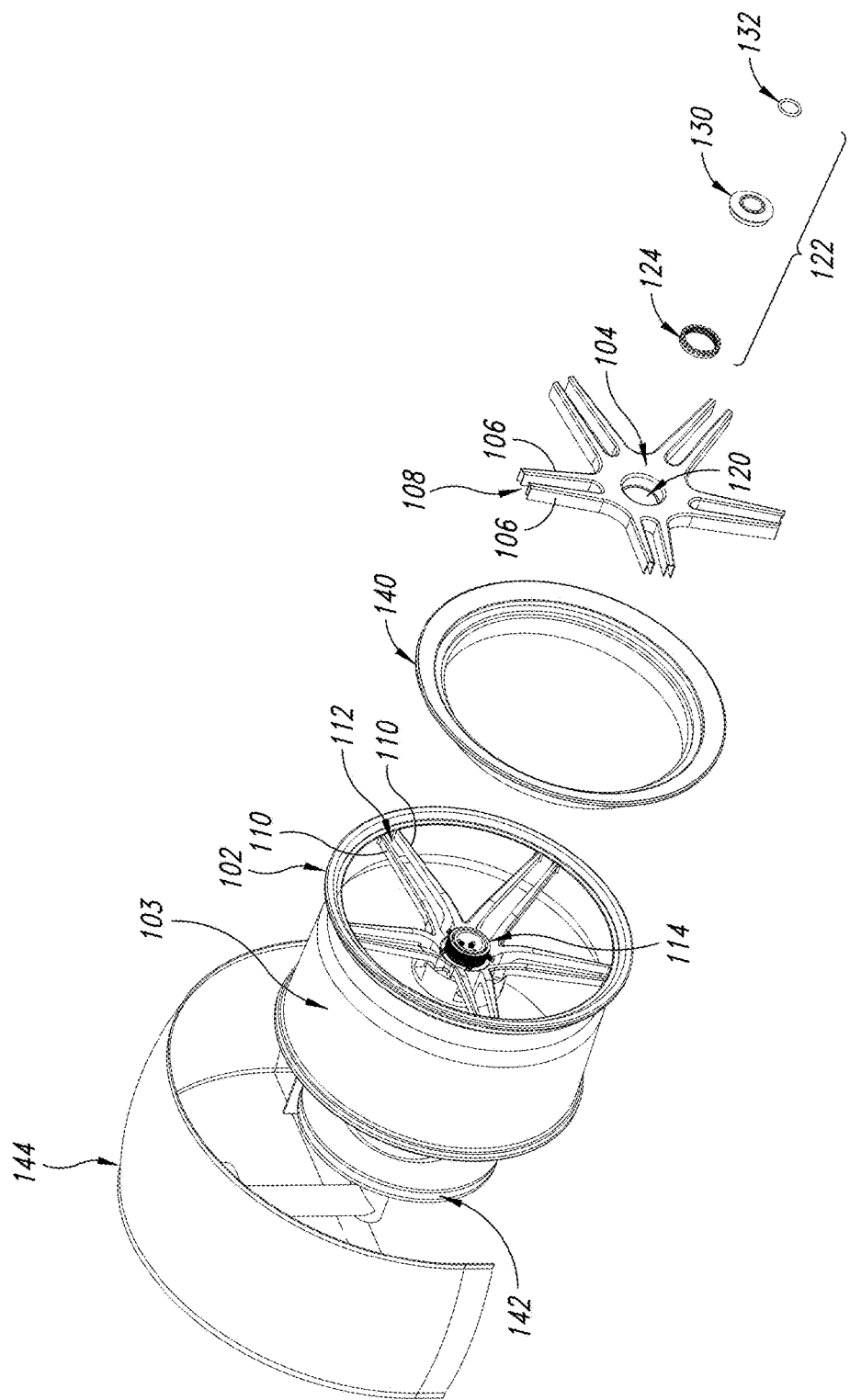
FIG. 8 is an exploded axonometric view of the wheel assembly of FIG. 5 in combination with an optional ring and an existing wheel hub and inner fender.

FIG. 8 is an exploded axonometric view of the wheel assembly of FIG. 5 in combination with an optional ornamental ring 140, an existing vehicle rotor 142, and an inner fender 144 of a vehicle, such as an automobile. The rotor 142 has a conventional five-lug arrangement, and the wheel 102 has the five openings (not visible in this view) sized and arranged to slide over the lugs on the rotor 142 to be secured in place with conventional lug nuts (not shown). FIG. 8 is important because it adds the ring 40 top enable attachment, and then another ring can be attached, which is another form of altering the appearance inside the interior and along the depth of the barrel of the wheel. This gives the ability to transform whatever the outer rim looks like while allowing the base to stay the same.

Figure 9:
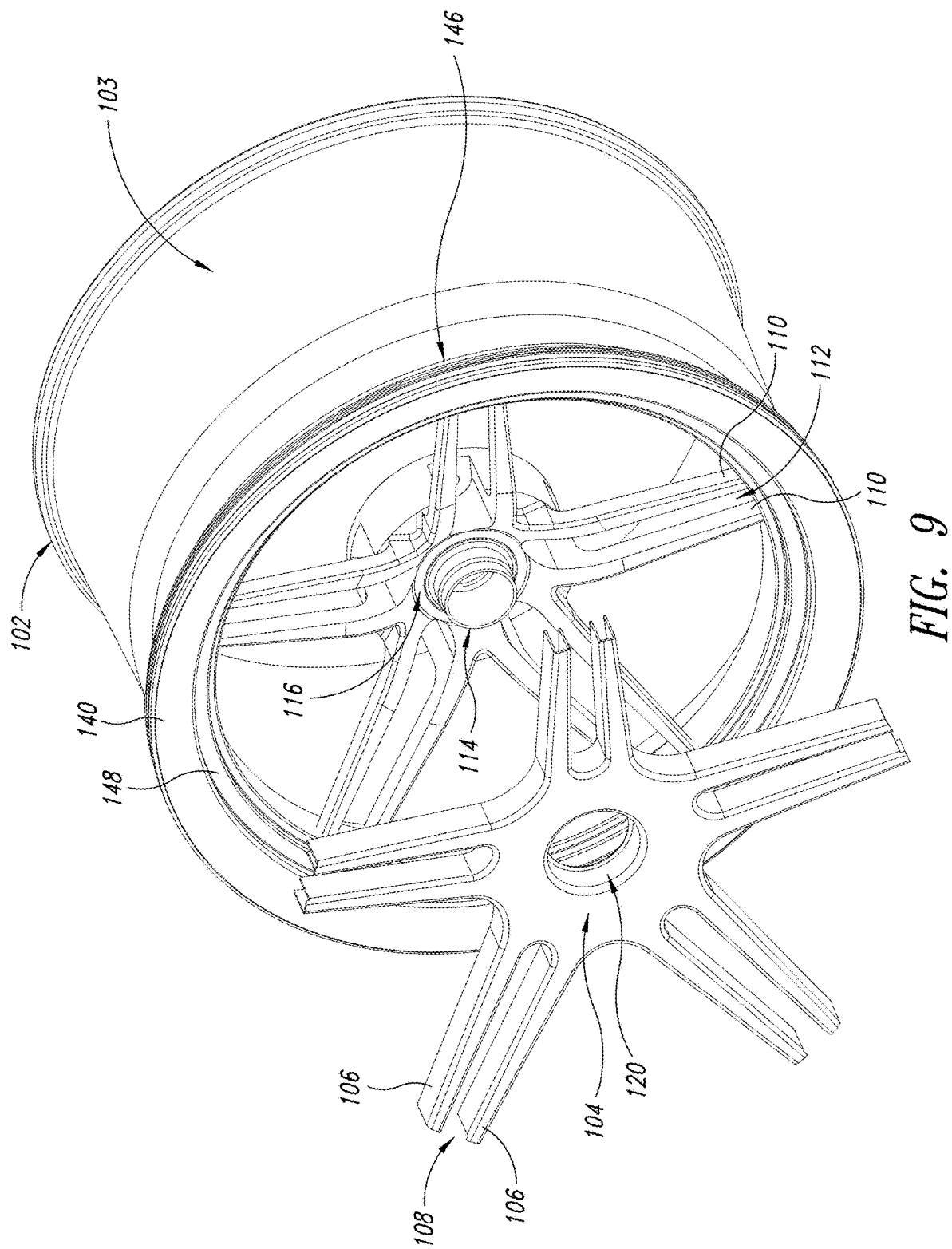
FIG. 9 is a partially assembled view of the wheel, ornamental face, and ornamental ring of FIG. 8 with an exploded view of the lock assembly.
Figure 10:
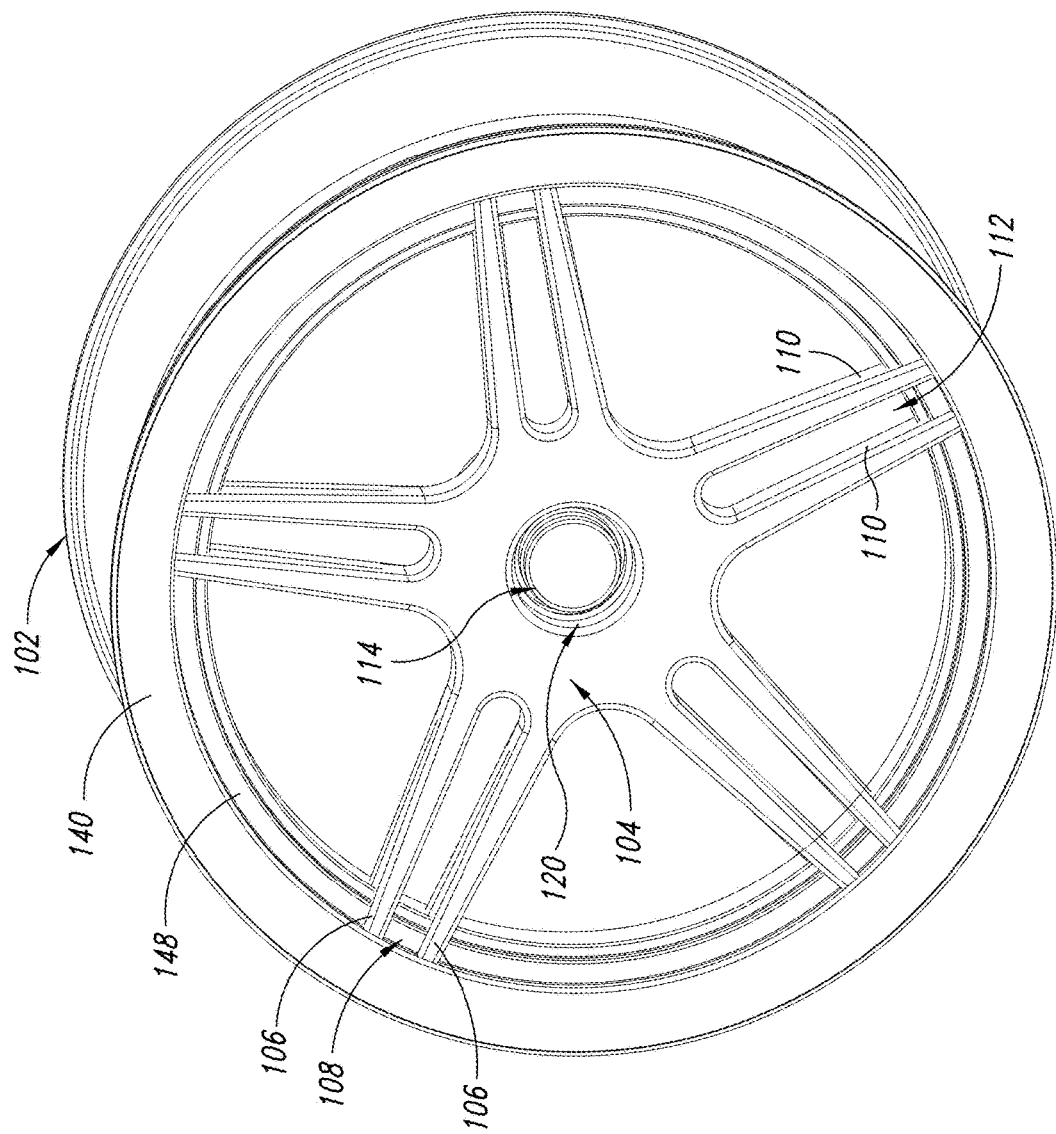
FIG. 10 is an axonometric view of the assembled base wheel, ring, and ornamental face of FIG. 9 showing the deep dish ornamental ring having a stepped lip positioned under the ornamental face.

FIG. 9 is a partially assembled view of the wheel 102, ornamental face plate 104, and ornamental ring 140 of FIG. 8, and FIG. 10 is an assembled view without the center lock assembly. As shown, the ring 140 is positioned on the outer portion of the circumferential rim 146 of the wheel barrel 103, and then the ornamental face plate 104 is placed on the wheel post 114, which is then secured in place with one of the center lock assemblies described above. The ring 140 has a stepped shoulder 148 that is sized and shaped to have the spokes 106 on the ornamental face plate 104 bear against the ring 140 when the ornamental face plate 104 is placed on the wheel center post 114. In one implementation of the present disclosure, the ring 140 is held in place by the spokes 106 of the ornamental face plate 104 bearing against the shoulder 148.

In accordance with another aspect of the present disclosure, the ring 140 may be snapped on to the wheel 102 or threadably engaged with the rim of the wheel 102 as described more fully below.

Figure 11:
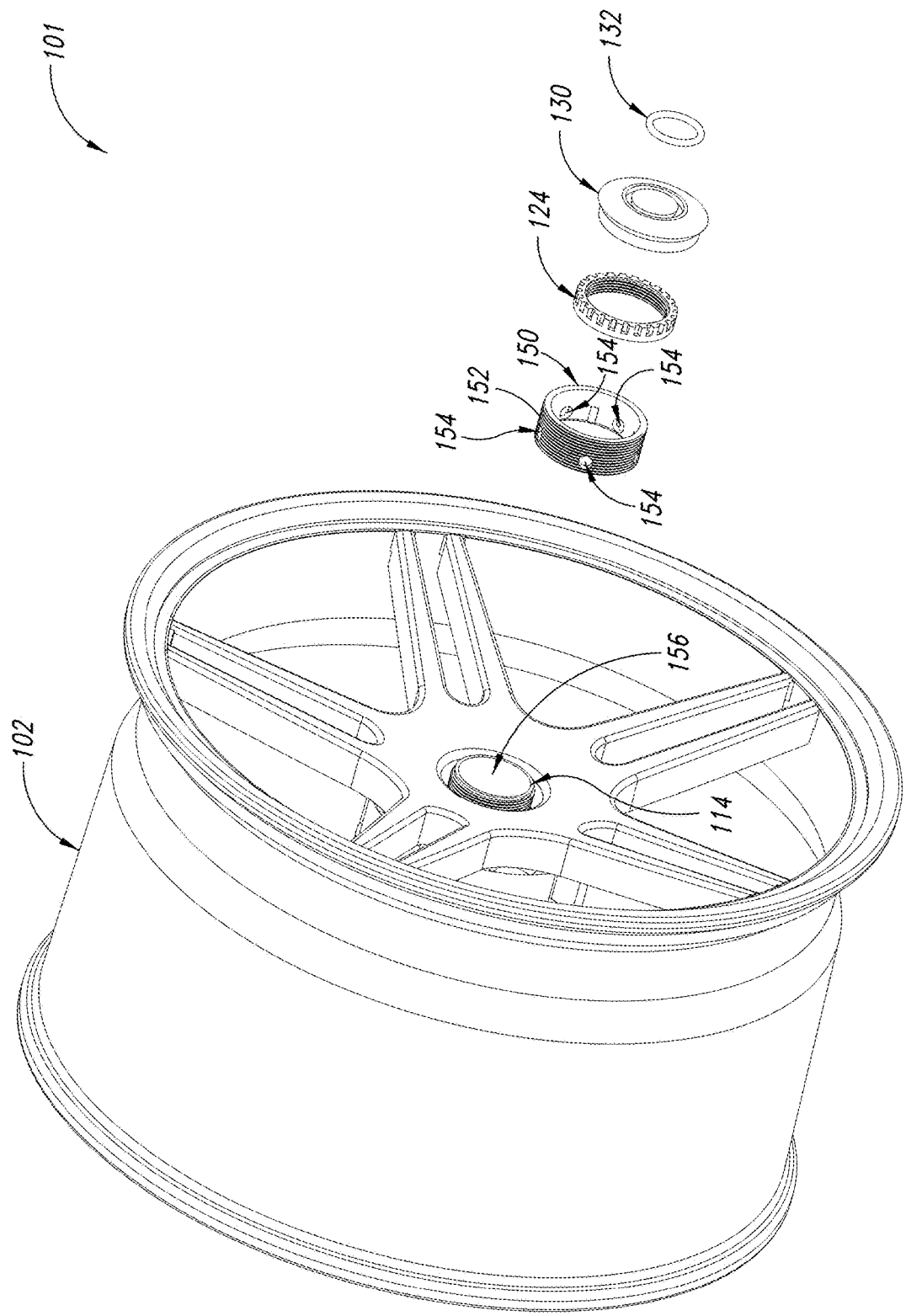
FIG. 11 is an axonometric view of the assembled base wheel and ornamental face of FIG. 5 and an alternative implementation of an exploded center lock assembly that employs a threaded sleeve.

In FIG. 11 the wheel assembly 101 of FIGS. 5 and 6 is shown with an alternative center lock system that includes a threaded sleeve 150 in the form of a hollow cylinder having external threads 152 and one or more set screw openings 154 formed in a sidewall of the sleeve 150. The sleeve 150 is held in place with set screws (shown in FIG. 17) that are threadably engaged with the openings 154 in the side wall of the sleeve 150. Ideally a steel sleeve is preferred for its superior strength over aluminum and other softer metals, which prevents cross-threading by the king nut 124 during installation. The king nut 124 is threaded onto the exterior threads 152 of the sleeve 150, and the cap 130 has exterior threads that engage interior threads (preferably counter-clockwise, depending on the direction of rotation of the wheel) formed in the hollow interior 156 of the wheel post 114 (shown in FIG. 18).

Figure 12:
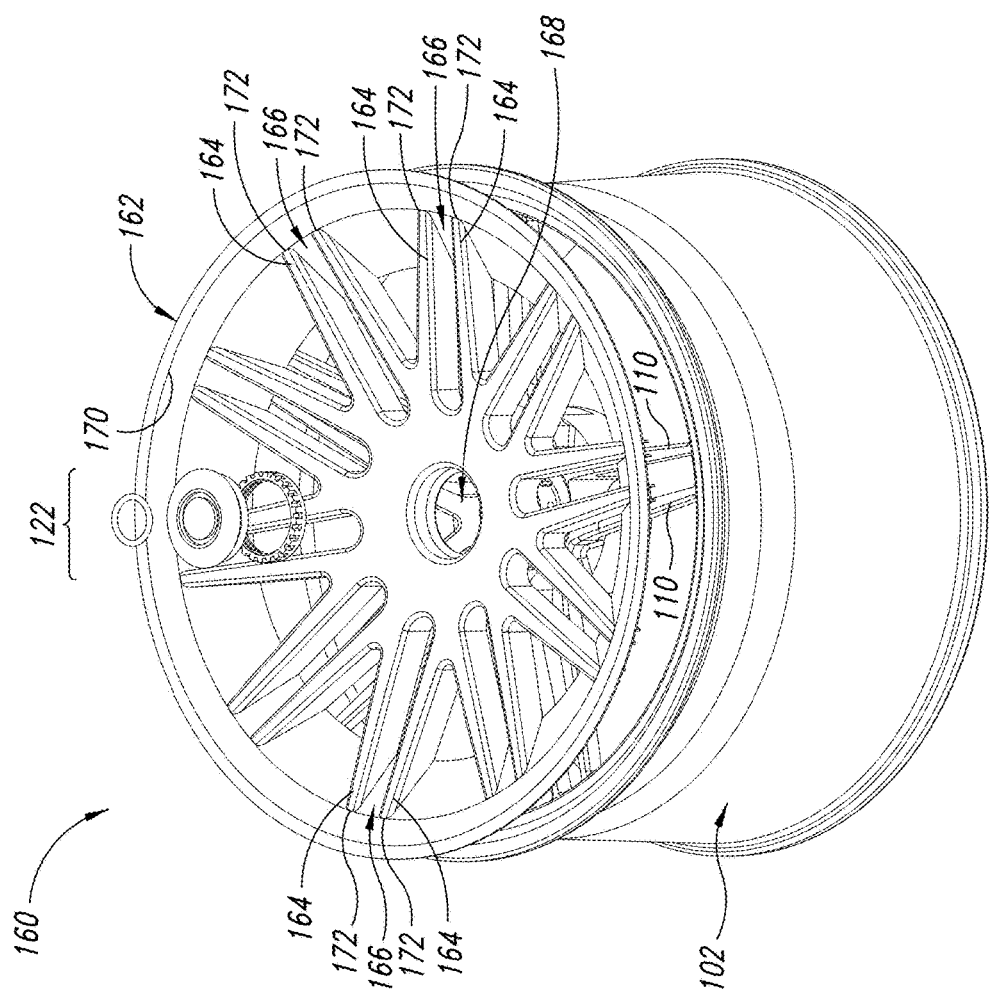
FIG. 12 is an exploded view of a 10-spoke base wheel, 20-spoke ornamental dished face, and center lock assembly.

Referring next to FIG. 12, shown therein are a wheel assembly 160 that employs the base wheel 102 and center locking assembly 122 described above in combination with a novel ornamental face plate 162 having 20 radial spokes 164 arranged in ten pairs 166. To avoid unnecessarily cluttering the drawing, only three pairs 166 of spokes 164 are labeled. The face plate 162 includes a center opening 168 sized and shaped to be slidably received over the wheel post 114 on the base wheel 102. The face plate 162 includes an integral circumferential ring 170 that connects to the distal ends 172 of each of the spokes 164. The ring 170 and spokes 164 present a deep dish design, and five pairs 166 of the ten pairs 166 of spokes 164 are aligned with and cover the spokes 110 of the base wheel 102 when the face plate 162 is assembled to the base wheel 102. The remaining five pairs 166 of spokes are interspersed and spaced equidistantly around the circumference of the face plate 162. This design allows the use of the face plate 162 and the spokes 164 to be added over a space in between the spokes of the base wheel and to be supported with no base wheel spokes behind it. The spokes can be positioned over a space where there is no underlying spoke from the base wheel. This adds a design feature that was not originally present in the base wheel and it is only supported by the center attachment point. This design feature is independent of the weight of the vehicle. In addition, the face plate 162 creates a different outer design, a lip, to a wheel without having to modify the wheel itself.

It is to be remembered that the ornamental face does not bear weight, hence the design of the face plate is not limited by that fact. Current wheel aesthetics are tied to holding weight because extra material is needed to hold the vehicle weight as well as to support the wheel design. This is inefficient, whereas the present design uses less material with resulting less weight. As seen in FIG. 12, it is more ornate without being a heavier design because there is nothing behind the ornamental spokes. Aesthetic appeal brings costly weight in prior designs.

Figure 13:
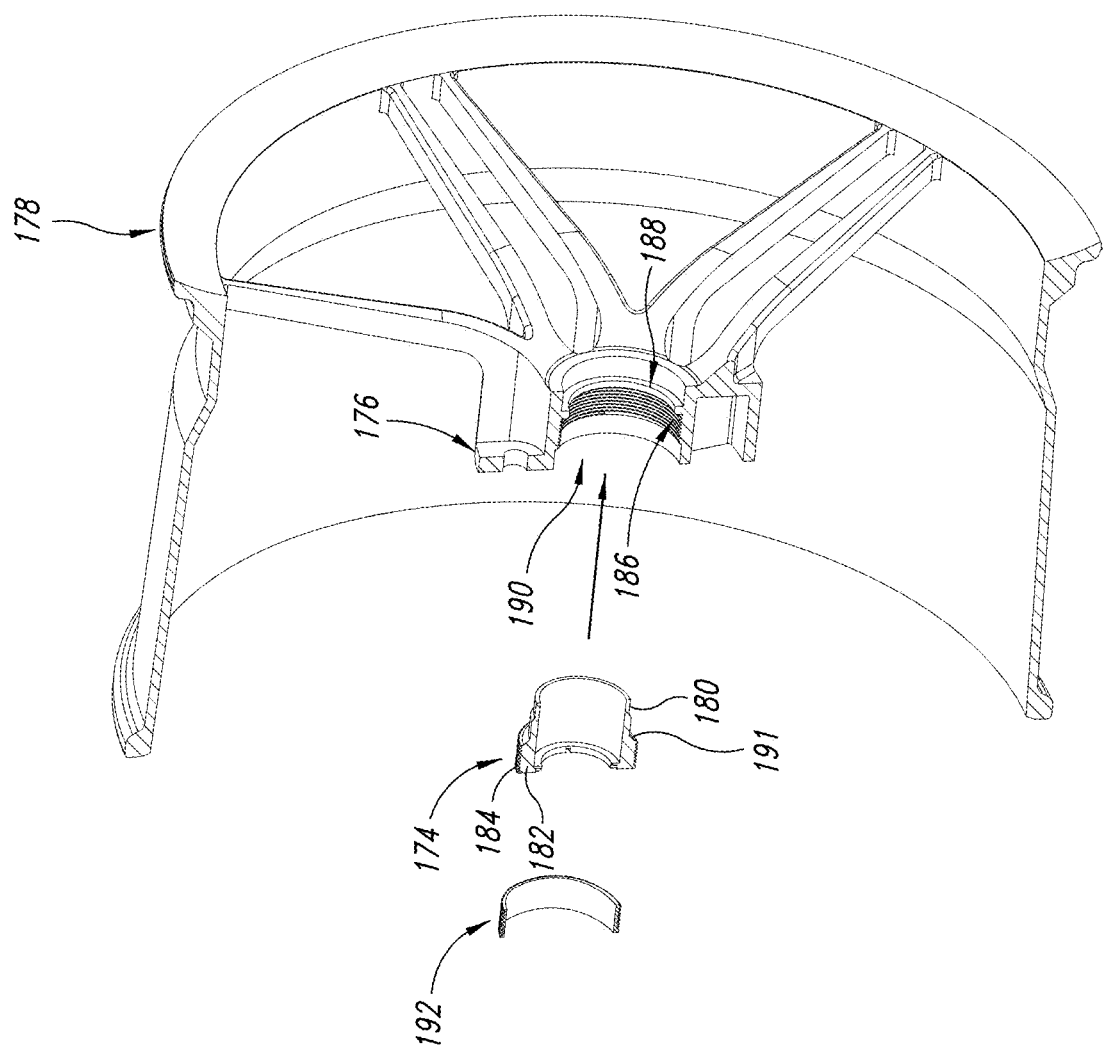
FIG. 13 is an axonometric exploded cross section view of a discreet externally threaded wheel hub engaging an internally threaded hub on a base wheel from the rear along with a rear internal set sleeve.

FIG. 13 is an axonometric exploded cross section view of a discreet externally threaded wheel post 174 engaging a wheel hub 176 on a modified base wheel 178. The wheel post 174 has an externally threaded nose 180 that may be hollow and include internal threads as well. The nose 180 is sized and shaped to receive an ornamental face plate and a center locking assembly in the manner described above. The discreet wheel post 174 also has a larger diameter base 182 with external threads 184 to engage internal threads 186 on the wheel hub 176 of the base wheel 178 from the rear thereof. A shoulder 188 on the internal longitudinal axial bore 190 engages a shoulder 191 on the discreet wheel hub 176 to stop the travel of the wheel hub 176 as it is threaded into the bore 190. The wheel post 174 can then be adjusted in its position relative to the base wheel 178 to enable adjustment in the position of an ornamental face plate attached to the wheel post 174 relative to the base wheel 178. A rear internal set sleeve 192 is threadably engaged with the internal axial bore 190 behind the wheel post 174 to prevent the wheel post 174 from moving relative to the base wheel 178. Essentially the set sleeve 192 acts as a jam nut when tightened against the wheel post 174.

Figure 14:
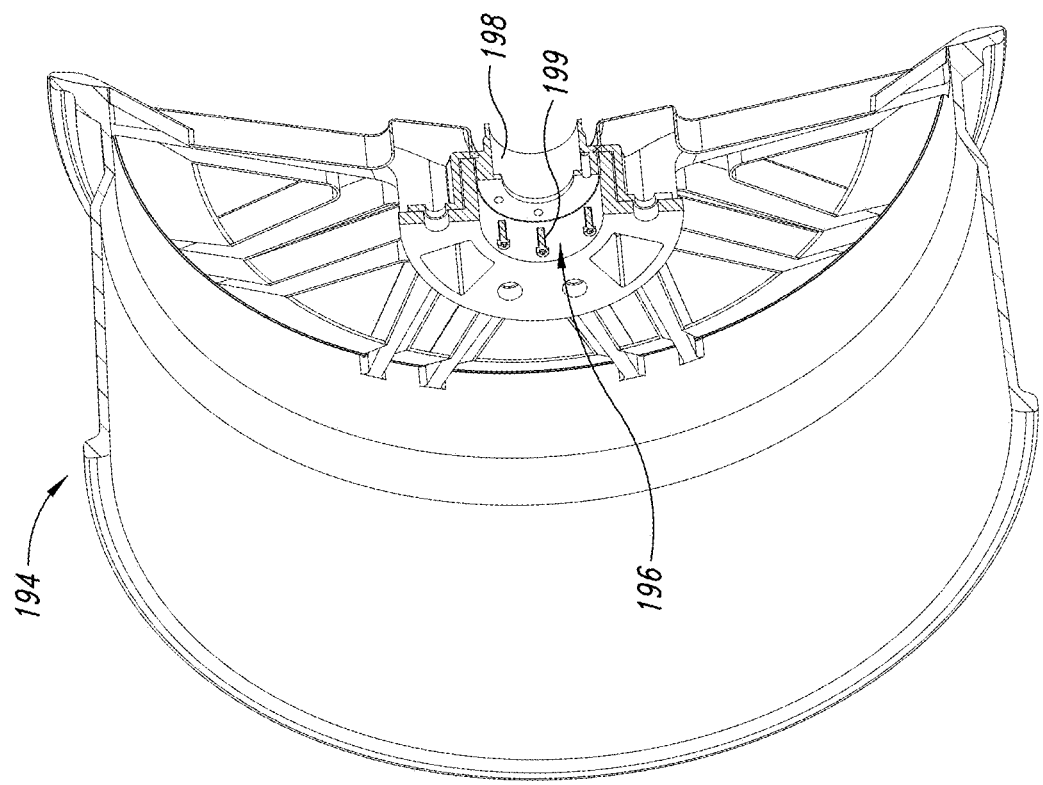
FIG. 14 is a rear axonometric view of a base wheel with a slide in center hub and retaining screws.

FIG. 14 is a rear axonometric cross-sectional view of a base wheel 194 with a smooth center bore 196 that receives a wheel post 198 in slidable engagement that is then held in place with retaining screws 199 that engage with the base wheel 194. This is an alternative to the implementation shown in FIG. 13.

Figure 15:
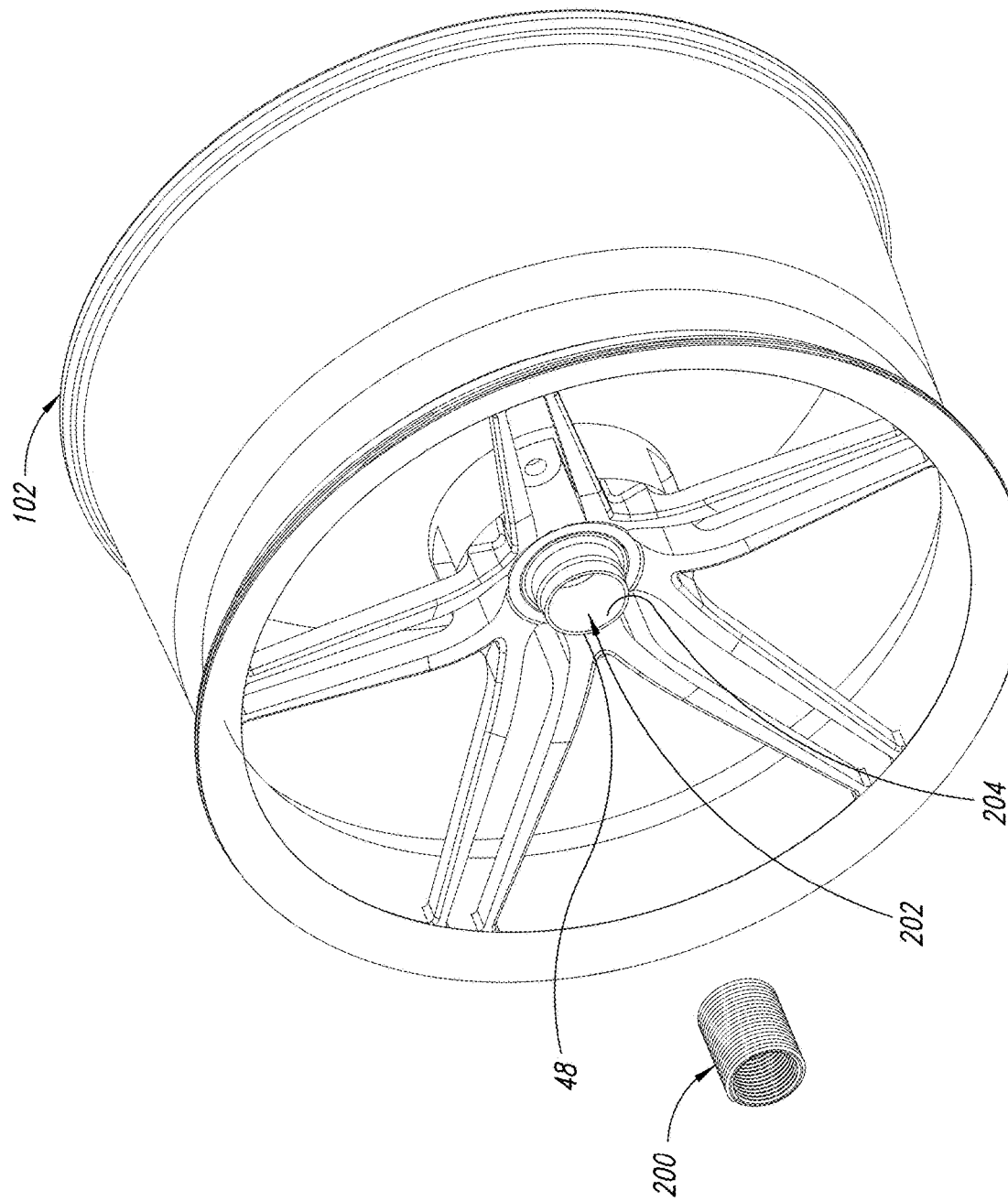
FIG. 15 is an exploded view of a helical coil insert and base wheel with a center hub sized and shaped to receive the helical coil insert.

Referring next to FIG. 15, shown therein is the base wheel 102 previously described and a helical wire insert 200 made of steel or similar material that is sized and shaped to be inserted into the wheel post 48 having a hollow internal axial bore 202 with smooth sidewalls 204. The insert 200 is a solution to having internal aluminum threads that can be prone to cross-threading. The stronger helical coil insert 200 also demonstrates the ability to exchange the thread insert in the future if necessary.

This implementation can also be utilized with an outer collar described below with respect to FIG. 18 to provide for an internal and external threaded center post.

Figure 16:
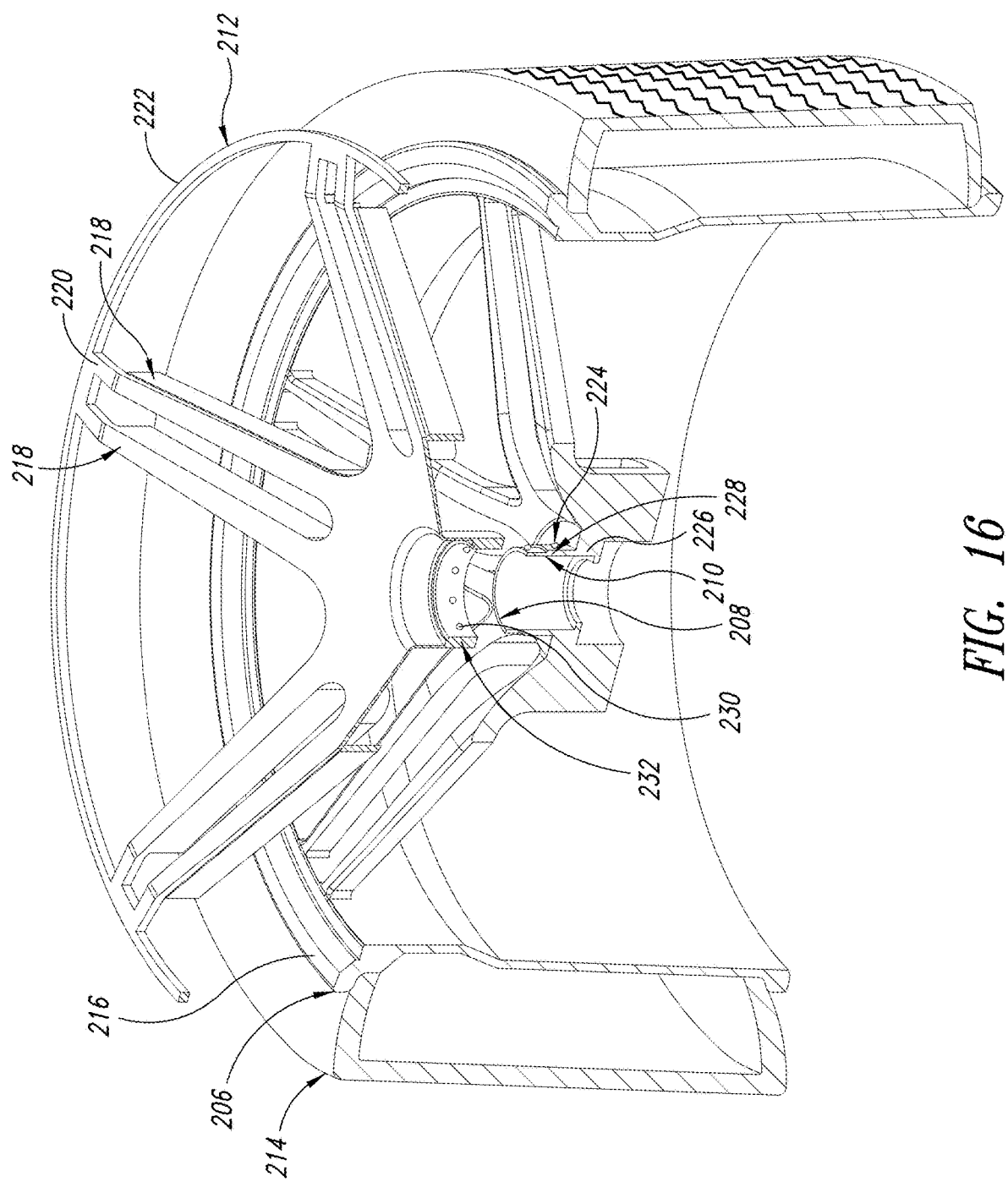
FIG. 16 is an exploded view of a 10-spoke base wheel having a stepped center hub utilizing a ball pin lock system for the ornamental face with spokes attached to a ring, attached at the end of the spokes.

FIG. 16 is an exploded view of a 10-spoke base wheel 206 having a stepped center post 208 utilizing a ball pin lock system 210 for the ornamental face 212. A tire 214 is shown mounted to the base wheel 206, which illustrates the relationship of the tire 214 to the distal rim 216 of the base wheel 206. The ornamental face 212 has spokes 218 with distal ends 220 attached to a ring 222 that is sized and shaped to engage with the distal rim 216 of the wheel 206, either by merely bearing against it as shown in this implementation, or by a more positive engagement, such as clipping to the rim 216. Spring loaded ball detents 224 are positioned at each of the two stepped faces 226, 228 on the exterior surface of the stepped center post 208 that are sized and shaped to engage with matching openings 230 found in a center annular collar 232 on the ornamental face plate 212.

The ornamental face plate 212 attaches to the stepped center post 208 by sliding the collar 232 over the post 208 until the ball detents 224 on the post 208 engage the respective openings 230 in the collar 234. The stepped nature of the post 208 provides a limit to the axial insertion of the ornamental face plate 212 on the post 208 to provide for different depths of insertion and to accommodate different depth faces. In addition, the stepped post 208 enables the post 208 to accept ornamental face plates that have collars of different diameters or to accept two ornamental face plates in a stacked relationship on the post 208. While two stepped faces 226, 228 are shown, it is to be understood that additional stepped faces may be formed on the post 208.

Figure 17:
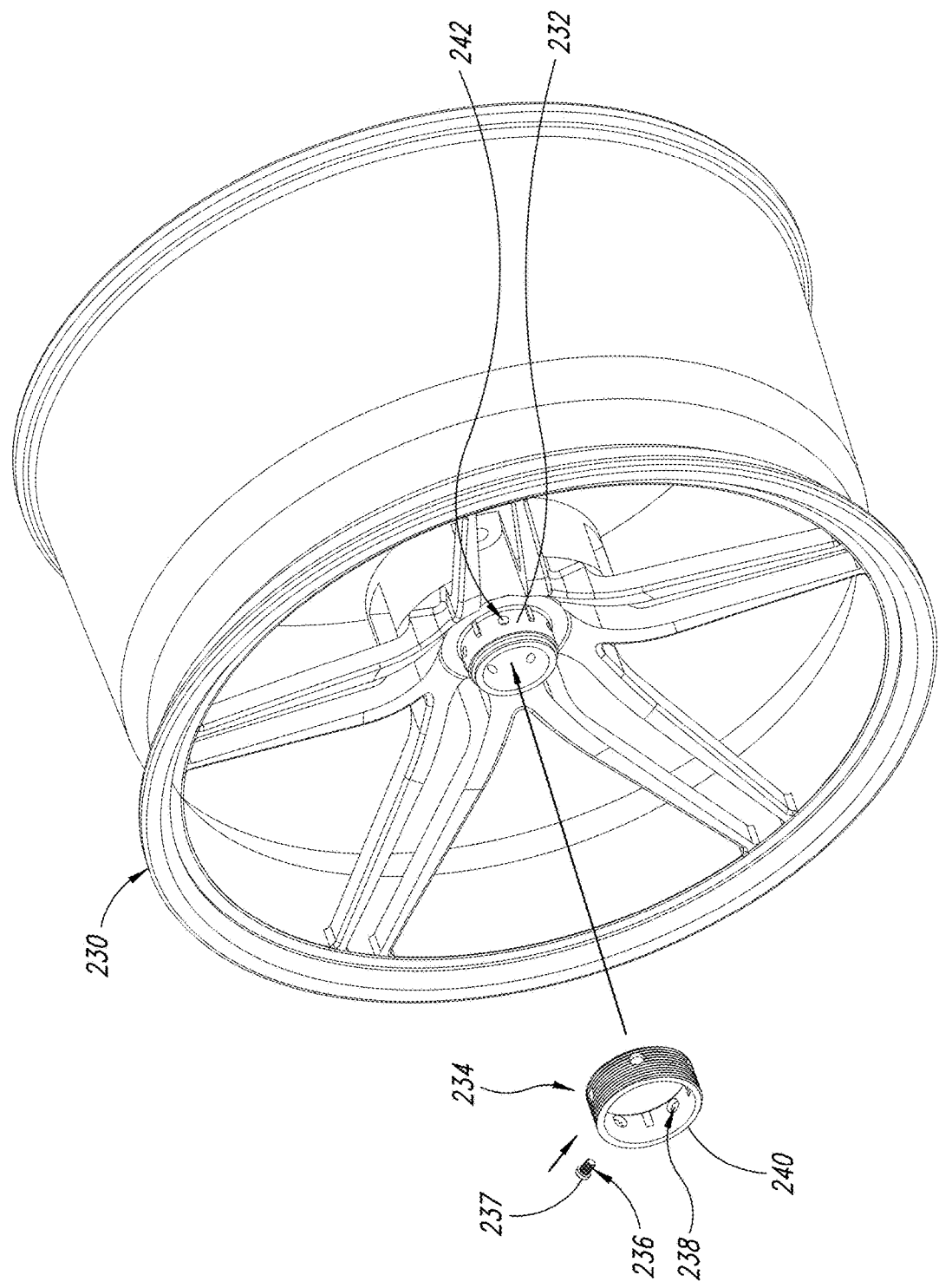
FIG. 17 is an exploded view of an externally threaded collar next to a base wheel hub with transverse locking screws to engage holes in the collar wall.

In FIG. 17 another implementation of a base wheel 230 is illustrated with a modified center post 232 to accept an externally threaded collar 234 with transverse set screws 236 to engage holes 238 in the collar wall 240. The set screws 236 have a length that ensures the heads 237 of the set screws will be recessed within the collar wall 240. Openings 242 can be formed in the center post 232 that accept the set screws 236, and these openings 242 may have internal threads to threadably engage with the threaded set screws 236 or they may have a smooth bore to allow the set screws 236 to pass into the openings 242 to ensure the set screw heads 237 are recessed enough in the collar wall 238 to not interfere with objects being threaded on to the exterior of the collar 234. A nut can also be used to secure the collar 234.

Figure 18:
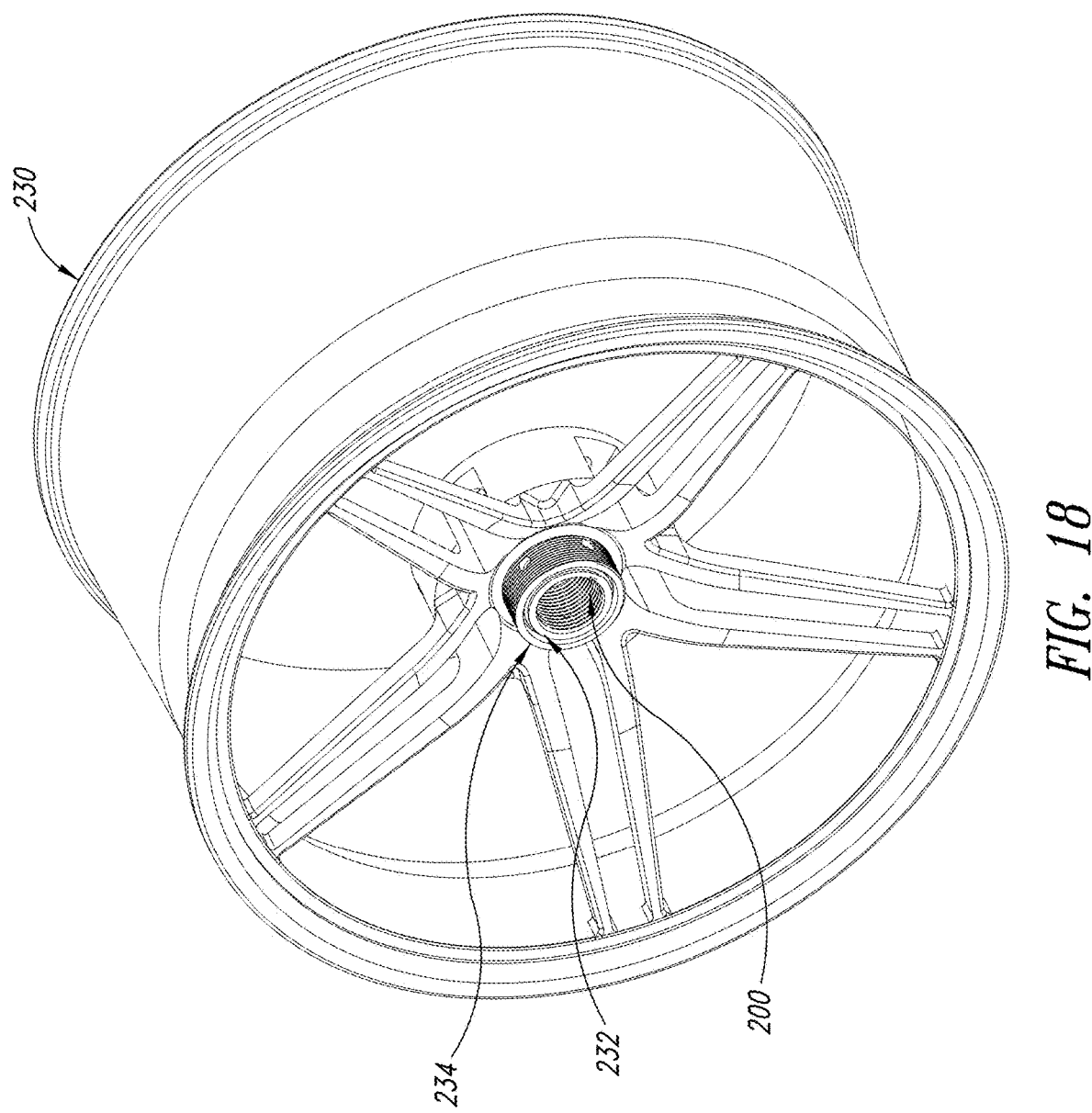
FIG. 18 is an exploded view of a base wheel in combination with an externally threaded collar and a heli-coil insert.

In FIG. 18 the externally threaded collar 234 is shown placed on the post 232 of the base wheel 230 in combination with the helical wire insert 200 positioned inside the post 232. This provides for threads on the exterior as well as the interior of the post 232.

Figure 19:
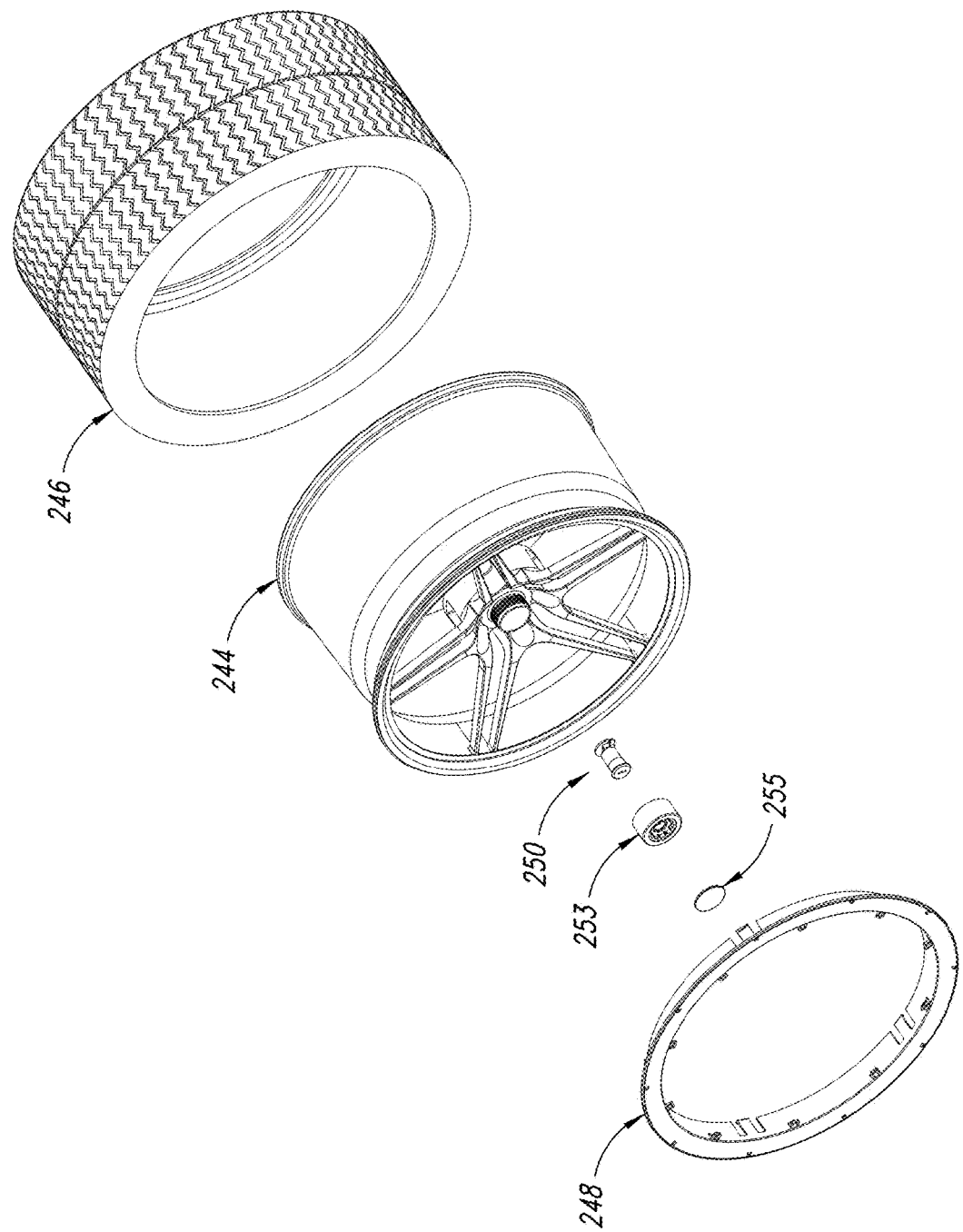
FIG. 19 is an exploded view of a base wheel, ornamental ring that clips to the base wheel incorporating tabs to hold non-backed spoke designs and a center key cylinder lock mechanism.
Figure 20:
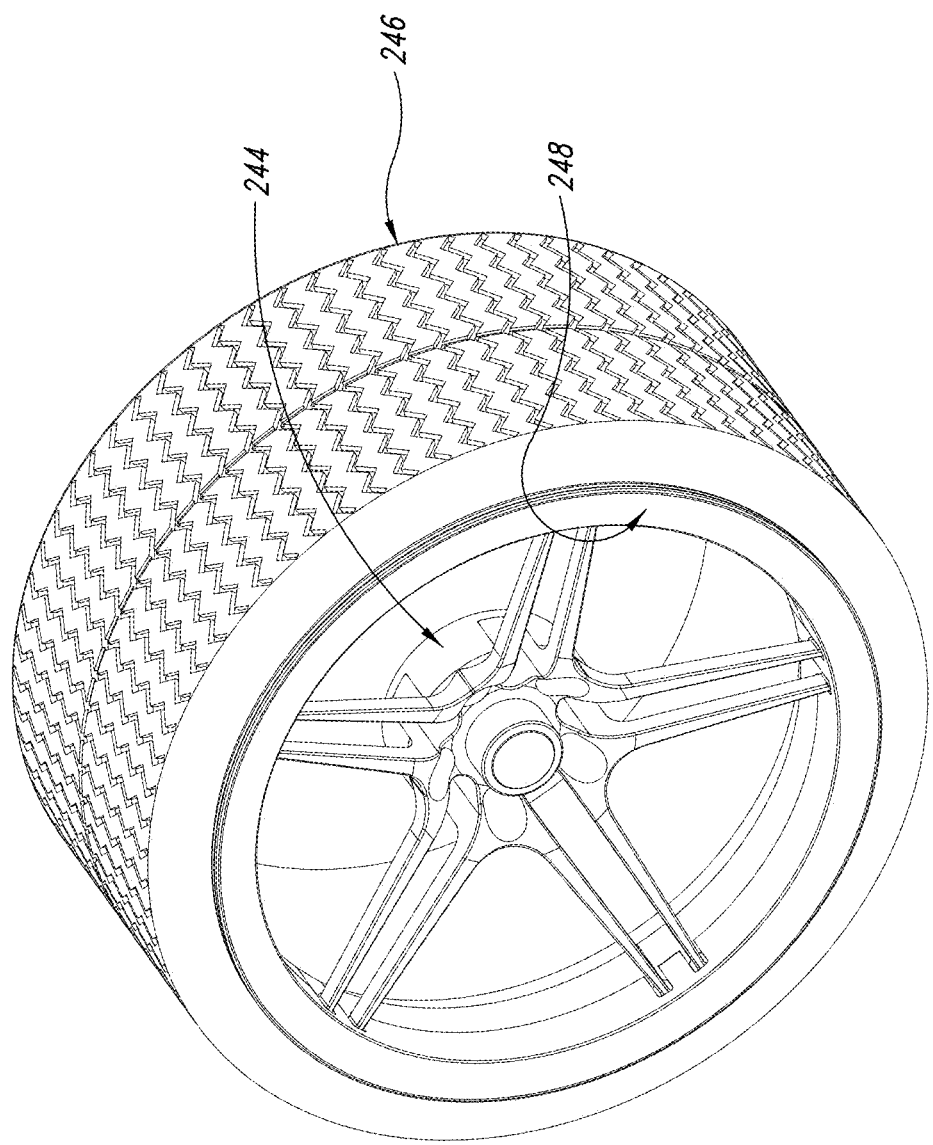
FIG. 20 is an axonometric view of the assembled base wheel, ornamental ring, and lock assembly of FIG. 19.

Turning next to FIG. 19, illustrated therein is an exploded view of a base wheel 244, which can be the base wheel 102 described above, along with an associated tire 246, an ornamental ring 248 that clips to the base wheel 244, and a center lock mechanism 250 for use in attaching an ornamental face plate to the base wheel. A cap 253 and ring 255 cooperate with a conventional cylinder key (center) lock mechanism 250 to retain an ornamental face (not shown) on the base wheel 244. FIG. 20 is an assembled axonometric view of the base wheel 244, tire 246, and ornamental ring 248. This view demonstrates the ability to add a ring, which in this case clips to the wheel, and then add a center-mounted ornamental face plate independently to the base wheel 244. Ring 248 provides structure for the ornamental face with attachment structure to incorporate a design to be held with the ring 248.

Figure 21:
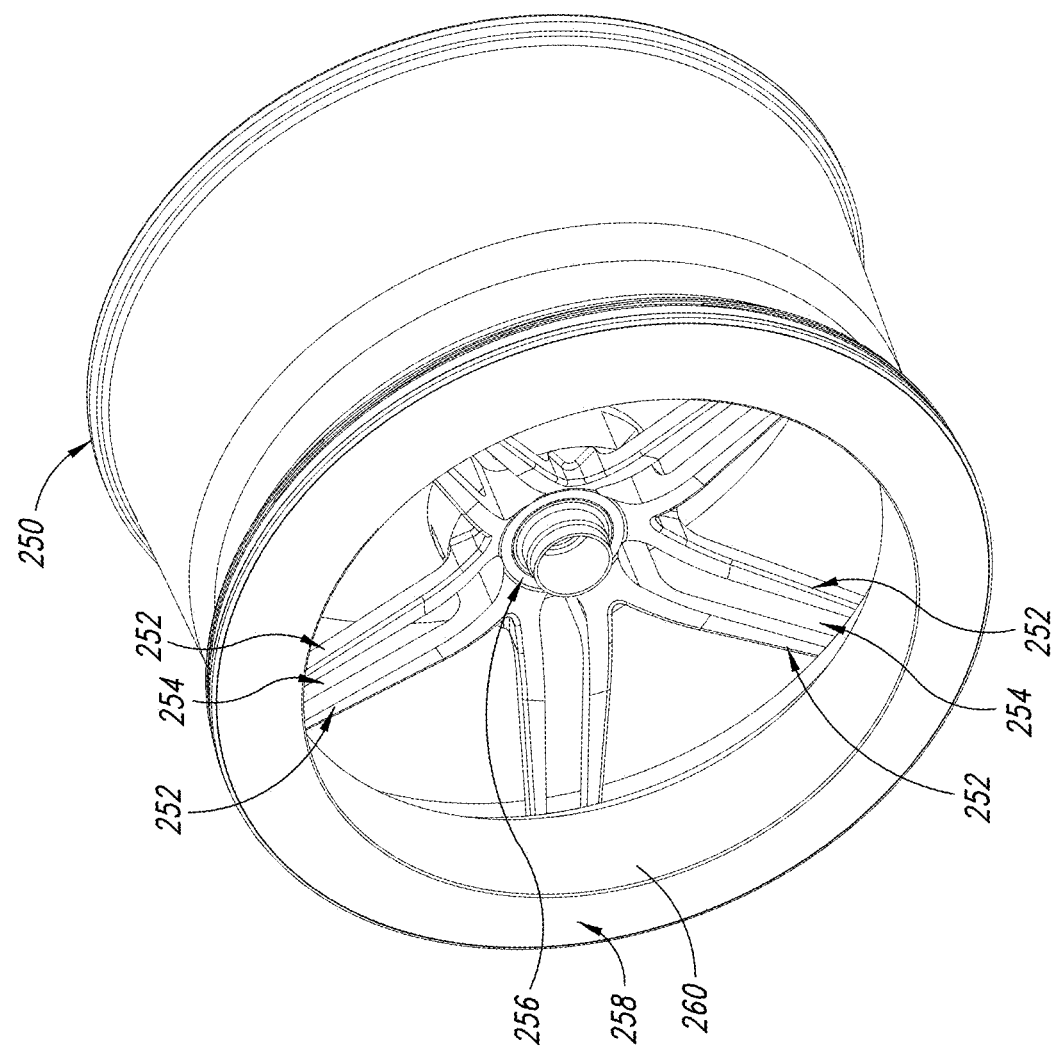
FIG. 21 is an axonometric view of a deep dish base wheel having 10 spokes arranged in five pairs of two spokes.

FIG. 21 is an axonometric view of a deep dish base wheel 250 having ten spokes 252 arranged in five pairs 254 spaced equidistantly around the circumference of the wheel 250. The center wheel hub 256 is recessed deeper into the wheel 250, as are the spokes 252, which provides more space for an ornamental ring 258 having a larger, deeper face 260 than in the designs described above.

Figure 22:
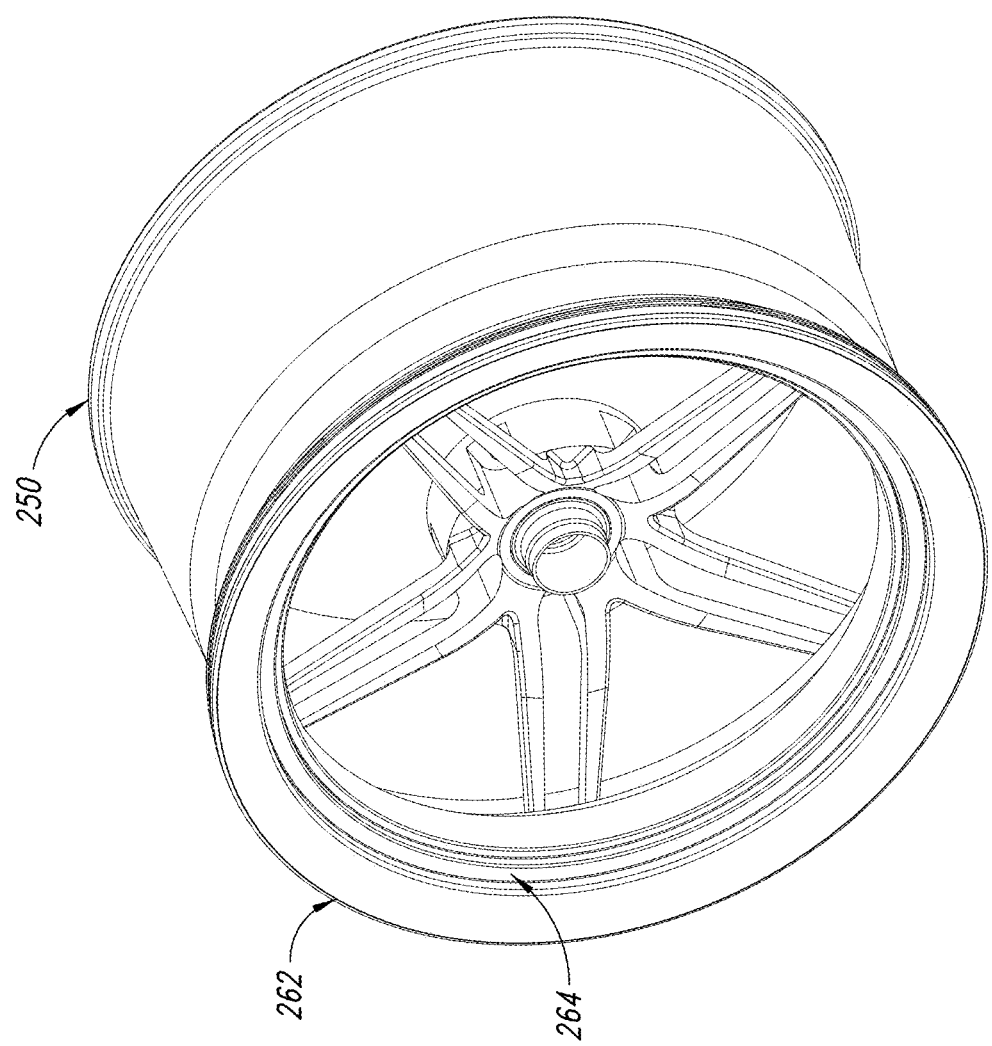
FIG. 22 is an axonometric view of a deep dish base wheel having 10 spokes arranged in five pairs of two spokes with a stepped annular terminal lip for attachment of faces and an annular ornamental ring with a stepped face attached to the base wheel.
Figure 23:
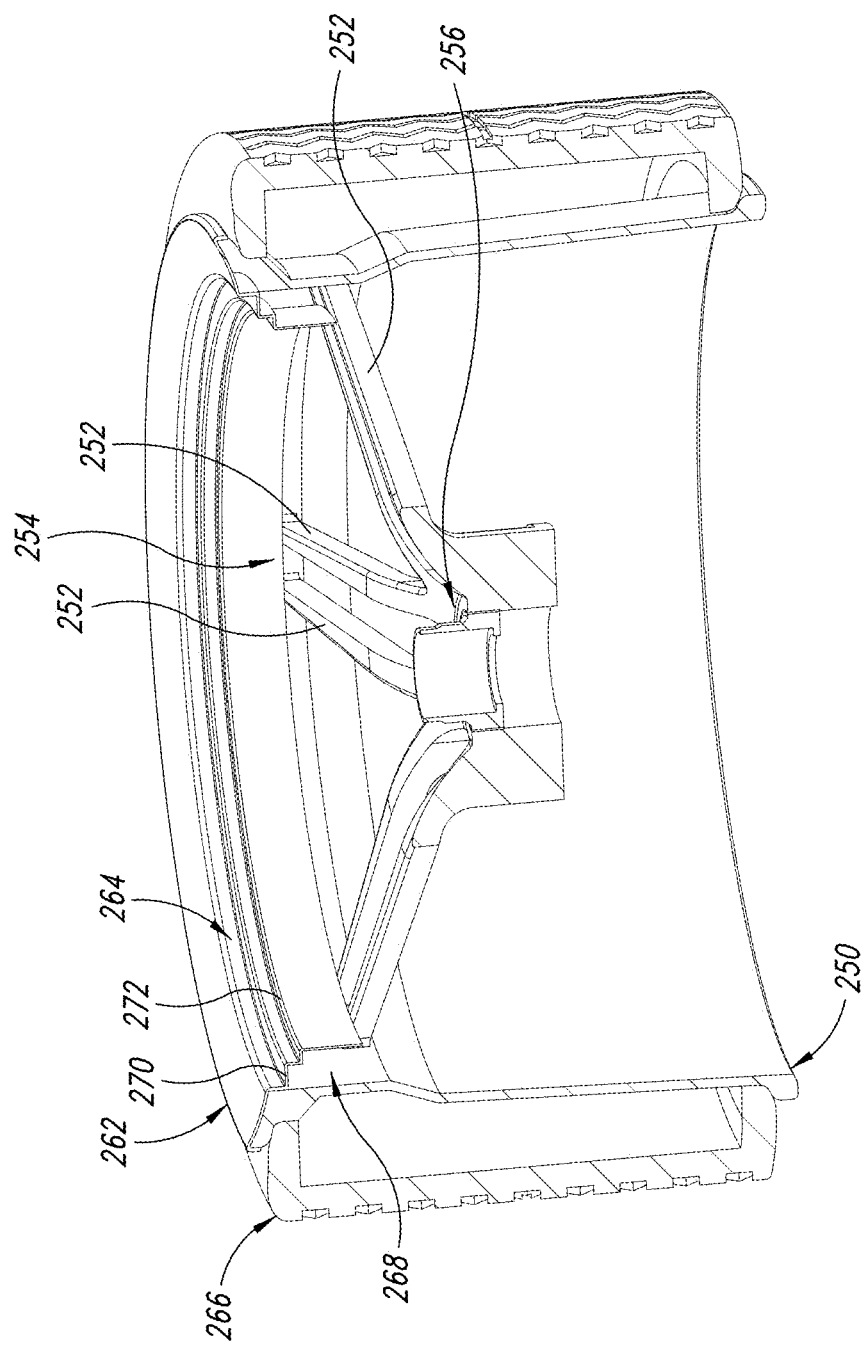
FIG. 23 is a cross-sectional view of the base wheel of FIG. 22 assembled with a ring and tire to illustrate an enclosed space to receive weights.

In FIG. 22, the deep dish base wheel 250 is shown with an ornamental ring 262 having a stepped annular face 264 that is attached to the base wheel 250. As shown in the cross-sectional view of FIG. 23, a tire 266 is added to show the relationship of the tire 266, wheel 250, and ornamental ring 262. As can be seen, the stepped annular face 264 of the ornamental ring 262 creates a space 268 between the ornamental ring 262 and the base wheel 250. This space 268 can be used to hold or receive weights, which are then concealed by the ornamental ring 262 after the wheel 250 and tire 266 are balanced. In this implementation, the ornamental ring 262 has two annular steps 270, 272 on the interior of the ring 262, which are shown most clearly in FIG. 23. The size and shape of the ornamental ring 262 and the annular steps 270, 272 are a matter of design choice that is not dictated by function. It will be appreciated that fewer or more steps can be formed on the ornamental ring 262 of varying sizes in order to present a different visual appearance.

Figure 24:
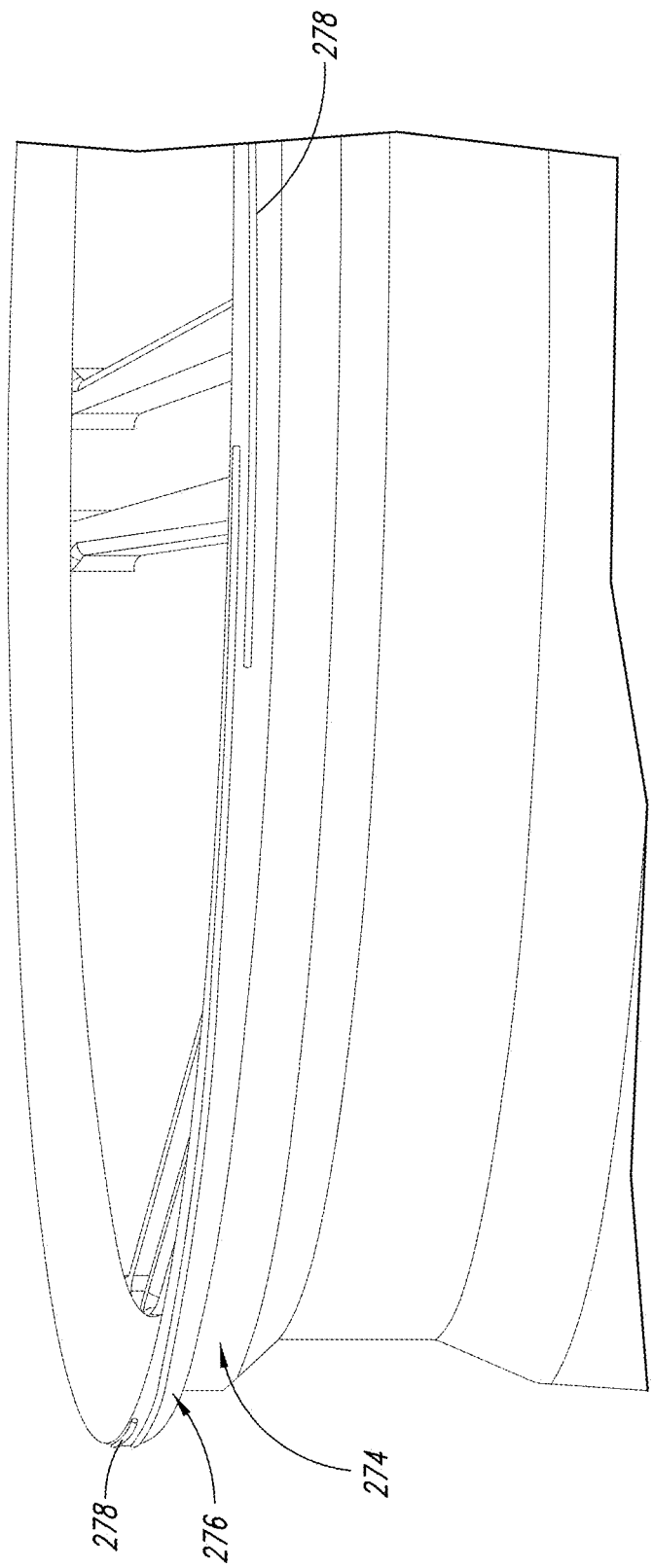
FIG. 24 is a partial side view of a base wheel having an annular lip with external threads, which could be directional based on the size of the vehicle.

Turning next to FIG. 24, shown therein is a base wheel 274 having an annular distal rim 276 with exterior threads 278 formed thereon. These threads 278 are sized and shaped to receive threads formed on an ornamental ring (not shown), which is one method of securing an ornamental ring to the wheel 274. This design eliminates or reduces a gap between an ornamental beauty ring and the side of a tire. In other words, the threaded rim 276 enables an ornamental ring to tighten down on the wheel 274 to close the gap between wheel and tire. Although a minimal number of threads are shown for ease of illustration, any number of threads can be used.

Figure 25A:
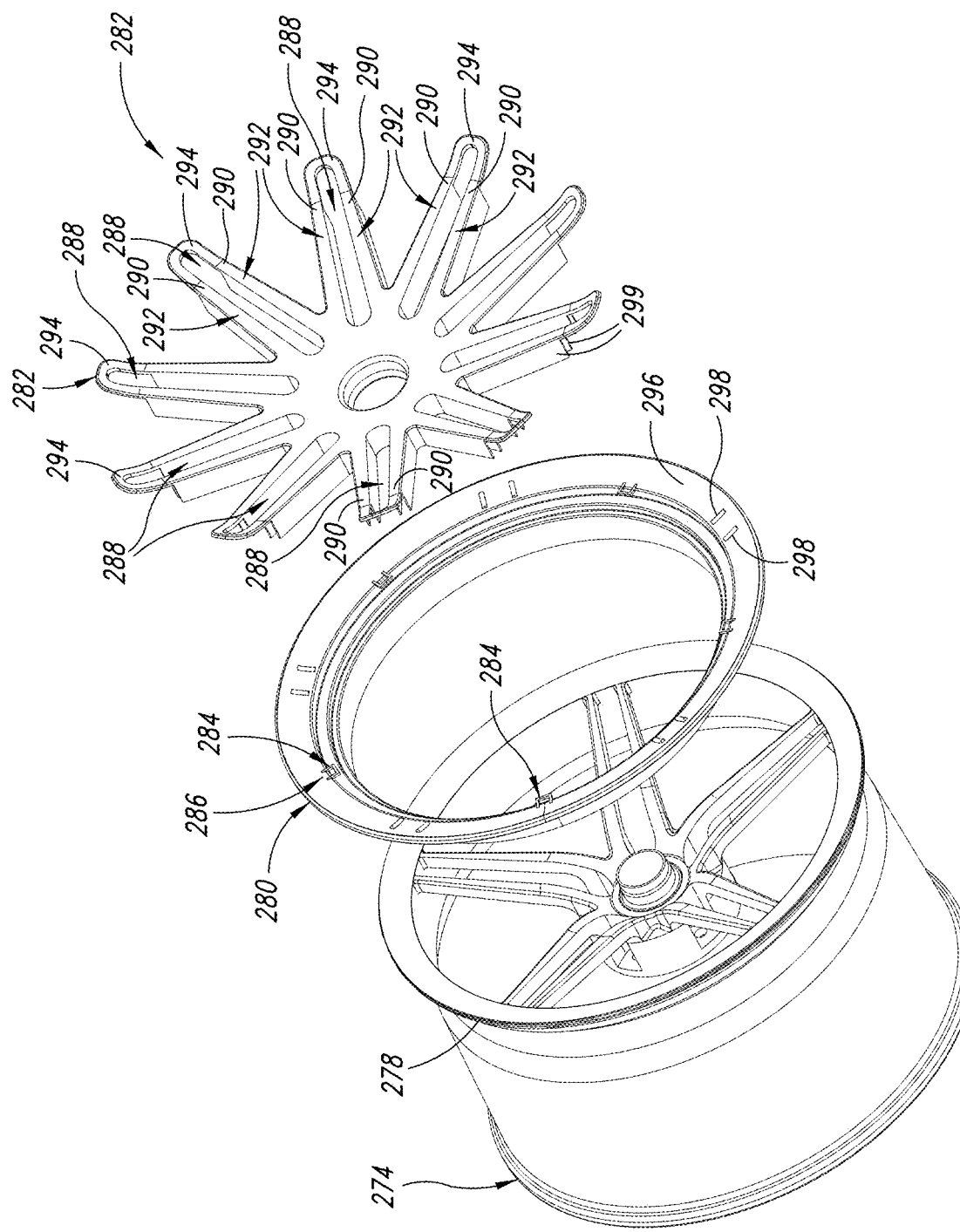
FIG. 25A is an exploded view of a base wheel, ornamental face with 10 spokes arranged in five pairs of two, and an ornamental ring having alternating tabs and paired slots to receive the ends of the spokes.

For example, FIG. 25A shows an exploded view of the base wheel 274 with an ornamental ring 280 and corresponding ornamental face plate 282 having twenty spokes 292 arranged in ten pairs equidistantly around the circumference of the face plate 282. The ring 280 could be clipped to the wheel 274, but it is preferred to use the threads 278 to attach the ornamental ring 280 to base wheel 274. In this implementation, the ring 280 will not only close the gap between a tire and the wheel 274, it will stabilize the ornamental face 282 on the wheel 274 with two attachment methods. The ornamental face can, in turn, stabilize the outer lip ring and prevent it from turning.

In the first attachment method, the ring 280 has tabs 284 with a central opening 286, each tab 284 sized and shaped to be slidably received in an opening 288 formed between the distal ends 290 of the spokes 292 on the ornamental face plate 282. A U-shaped terminal end 294 is formed at the distal ends 290 to connect each pair of spokes 292 together. The terminal end 294 is sized and shaped to extend over and bear against the annular face 296 of the ring 280. The second attachment method uses two female slots 298 formed in the annular face 296 of the ring 280 that are sized and shaped to receive the sidewalls 299 depending from the spokes 292 on the face plate 282.

As shown in FIG. 25A, these two methods are alternating, but each method may be used solely. For example, in FIG. 26, only the pairs of slots 298 on the ornamental ring 280 are used in conjunction with an ornamental face 300 having ten spokes 302 arranged in five pairs 304. This leaves the tabs 284 available to support a second ornamental face that can be stacked on top of the first ornamental face 300 as discussed below in connection with FIG. 25B. The tabs 284 and slots 298 also provide support for the spokes 292 when the base wheel has no underlying spokes to provide support. It is to be understood that the face plate 282 can extend beyond the edge of the rim or the ring 280, which is a unique aspect that can only be accomplished with the design of the present disclosure, otherwise it would not be possible to mount a tire.

Figure 25B:
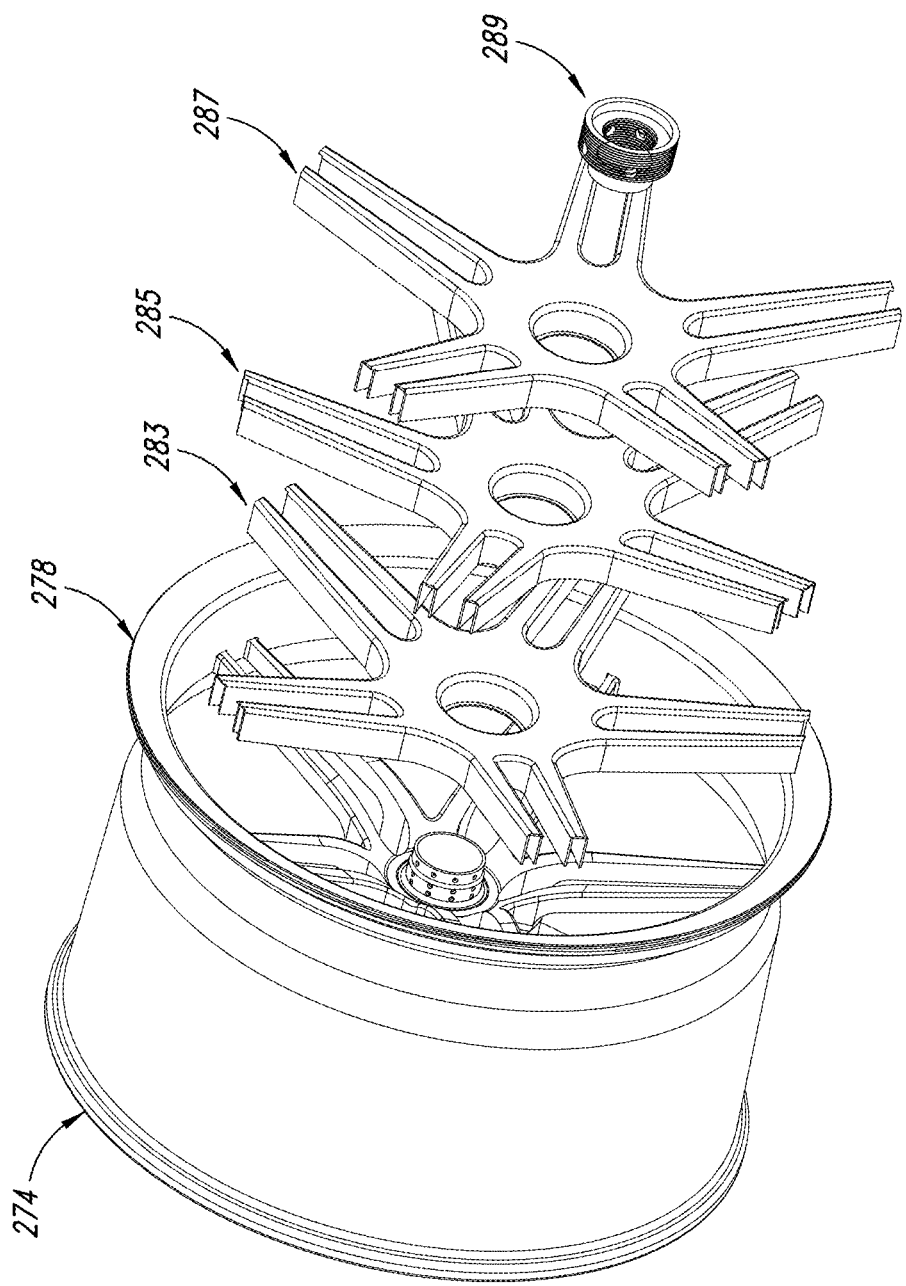
FIG. 25B is an exploded view of an alternative implementation in which three ornamental face plates are attached in tandem to a single base wheel.

FIG. 25B illustrates how multiple ornamental face plates can be arranged in a tandem or stacked relationship. In this implementation, there are three face plates 283, 285, 287 that are mounted to the base wheel 274 and held in place with a king nut 289. There are multiple openings shown in the center attachment point that are in stacked relationship along the axis of rotation of the wheel to enable attachment of one or more face plates at different depths in the interior of the wheel barrel. Detents on the face plates 283 can be used to snap into the openings in the center attachment point.

Figure 26:
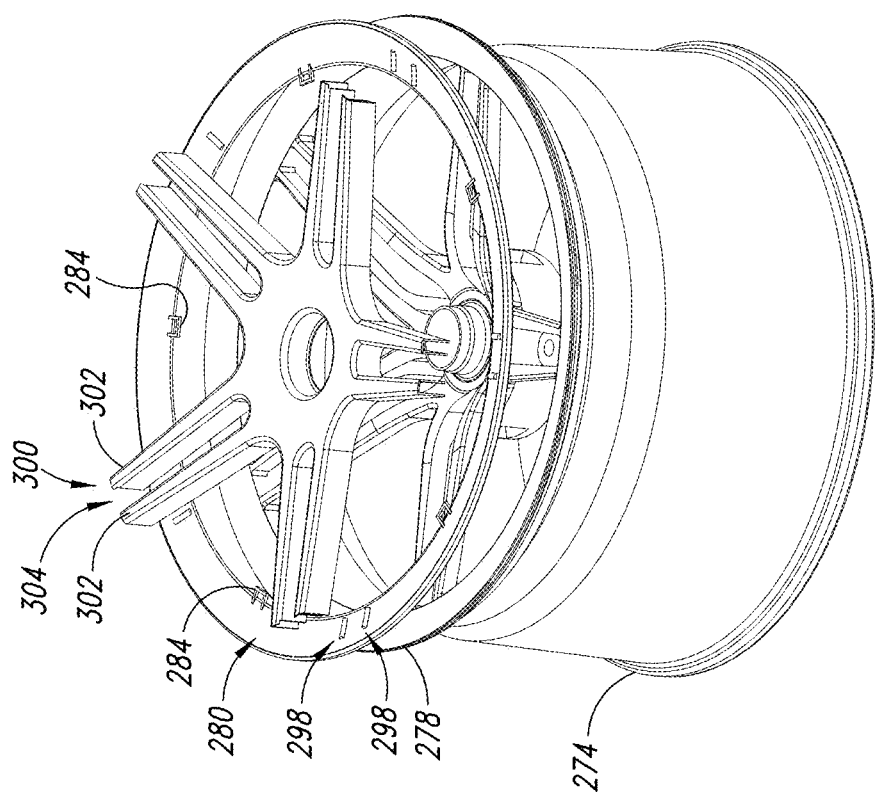
FIG. 26 is an exploded view of a base wheel, an ornamental ring having alternating paired slots and tabs, and a 10-spoked ornamental face center portion to attach to the tabs on the ring and configured to accept a second ornamental face on top of the first ornamental face with spokes to be received in the paired slots.

FIG. 26 illustrates the wheel 274 and ring 280 used in conjunction with an ornamental face plate 300 having only ten spokes 302 arranged in five pairs 304 spaced equidistantly around the circumference of the face plate 300. Here, the spokes 302 have sidewalls that are sized and shaped to be received within slots 298 in the ring 280. The slots 298 are used as an accepting point to be used with longer design spokes, such as spokes 282 and 294 shown in FIG. 25A. The underside of spoke 282 accepts the spoke 298.

Figure 27:
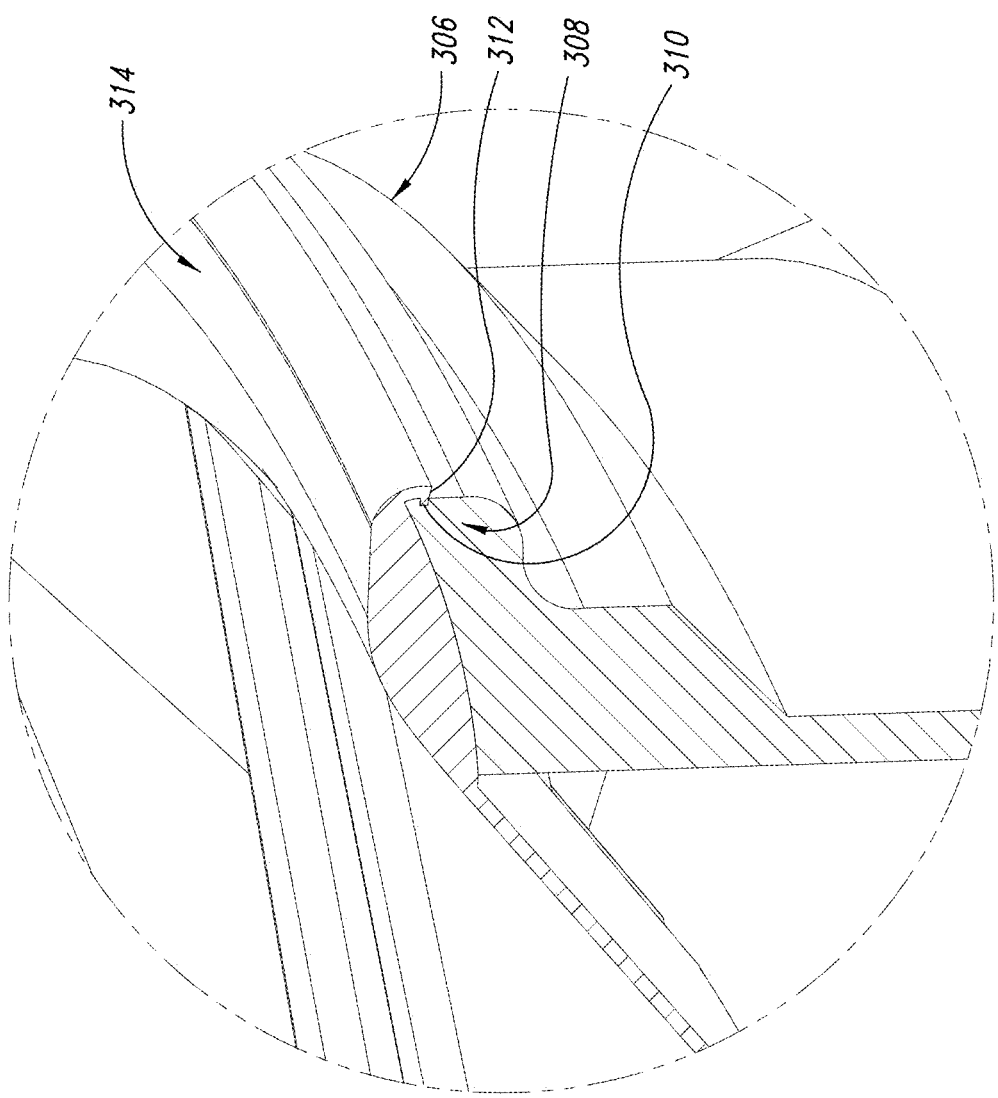
FIG. 27 is a partial side view in cross section of a base wheel with an ornamental ring clipped to an annular lip on the base wheel.

FIG. 27 is an enlarged cross-sectional view of a portion of a base wheel 306 that has an annular distal rim 308 with a slot 310 sized and shaped to receive a tab 312 formed on the outer extremity of a ring 314. This provides a secure form of attachment of the ring 314 to the wheel 306. This is an alternative to the threaded attachment described above.

Figure 28:
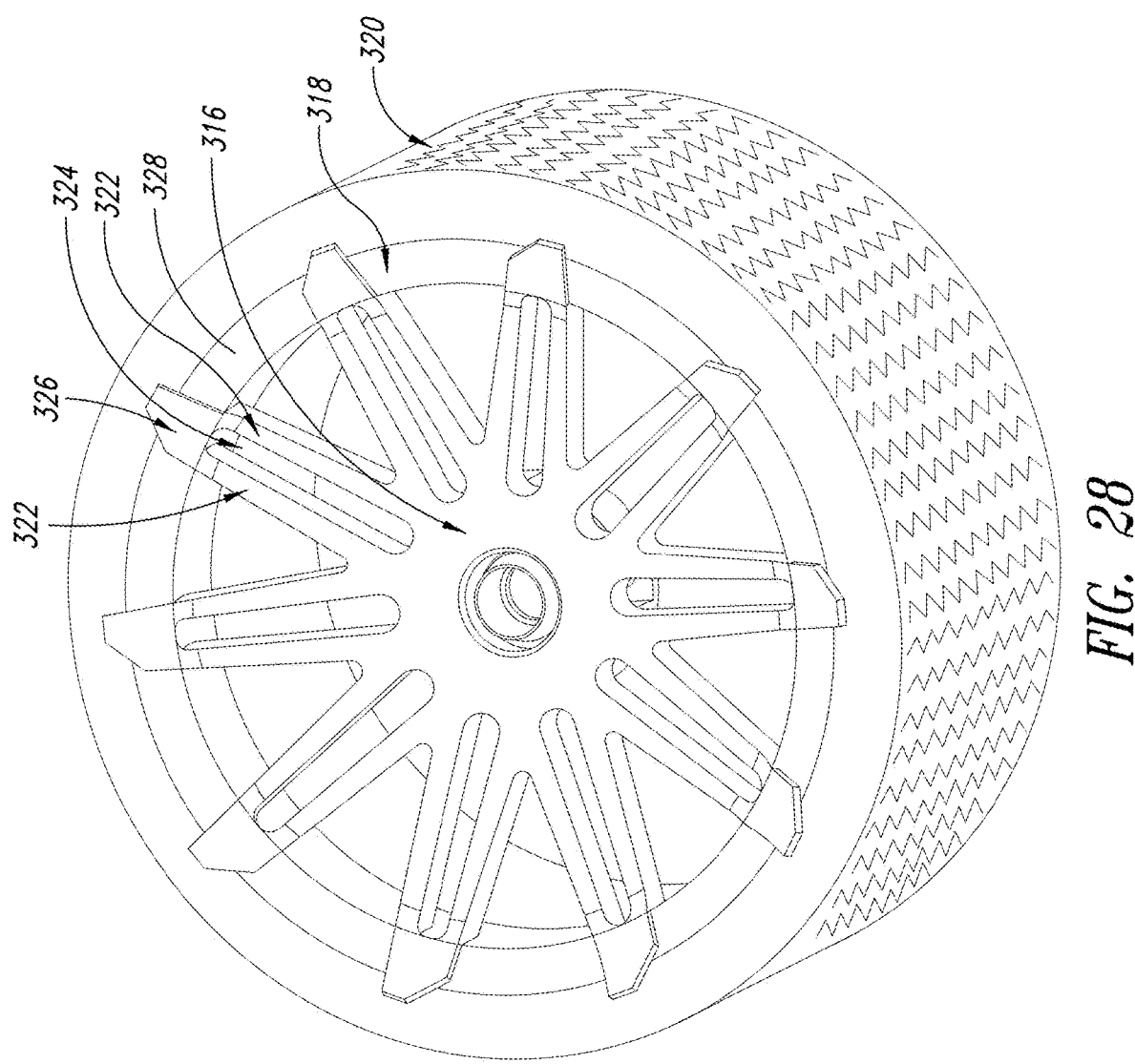
FIG. 28 is an axonometric view of an assembled base wheel with a tire and 20-spoked ornamental face in which paired spokes have a common terminal end that is solid and extends onto a portion of the tire.

In FIG. 28 is shown a 20-spoke ornamental face 316 positioned on a base wheel 318 that includes a tire 320 mounted thereon. In this implementation, the ornamental face has the spokes 322 arranged in ten pairs 324, with each pair 324 connected together at their distal ends with a terminal connector 326. The connector 326 is sized and shaped to overlap past the rim 328 of the wheel 318 and on to the tire 320. This demonstrates how the ornamental faces can be changed with respect to size, number of spokes, arrangement of spokes, length, design, and even color (not shown). This also demonstrates the ability to have an ornamental face protrude past the rim into the tire given it is added after the tire is mounted.

Figure 29:
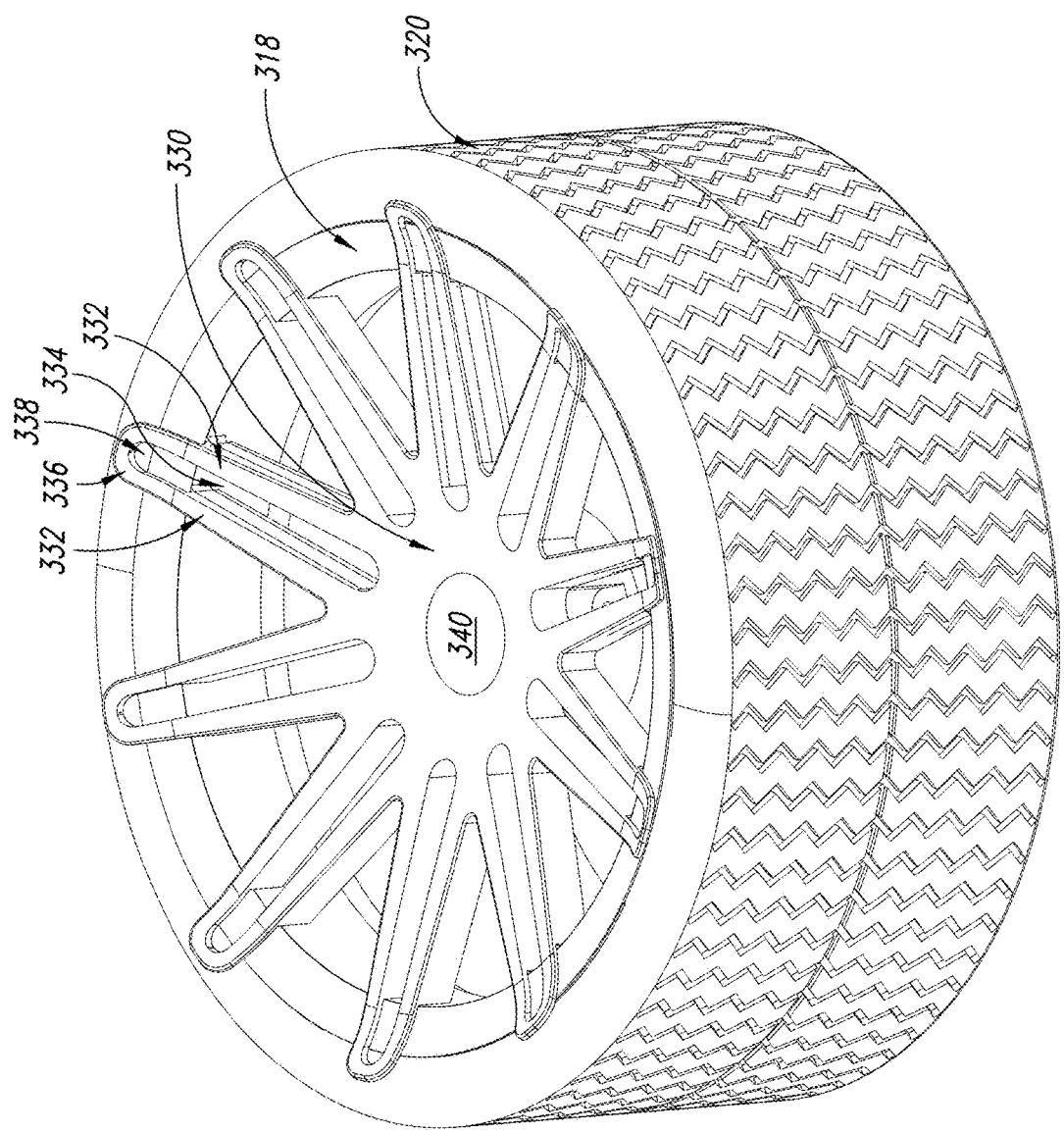
FIG. 29 is an axonometric view of an assembled base wheel with a tire and 20-spoked ornamental face in which paired spokes have a common terminal end that has an opening extending onto a portion of the tire.

FIG. 29 shows the wheel 318 and tire 320 from FIG. 28 with a new ornamental face 330 again having twenty spokes 332 arranged in ten pairs 334 spaced equidistantly around the circumference of the ornamental face 330. Connecting the distal ends of each pair of spokes is an open hoop connector 336 able to extend past wheel 318 that overlaps the tire 320, with the open space 338 in the connector 336 at least partially overlapping the tire 320 to allow a portion of the tire 320 to be visible through the connector 336. This presents a different visual effect when all the elements are mounted together and held in place with the center lock assembly 340. It is to be understood that this implementation can be used with a ring, such as the ring 314 described above.

Figure 30:
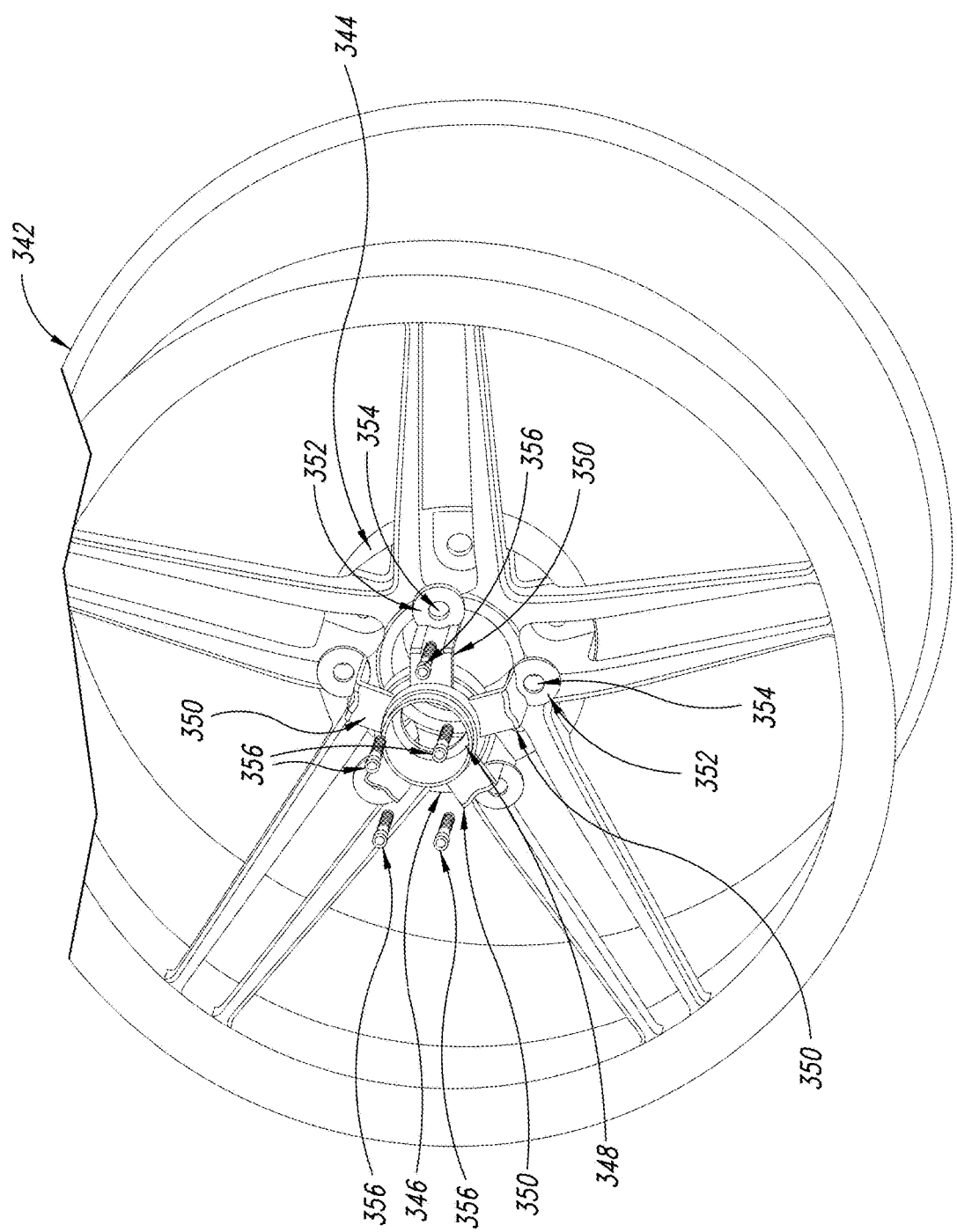
FIG. 30 is an axonometric exploded view of a base wheel with a five-spoked removable center post positioned over the center hub of the base wheel.

In FIG. 30 is illustrated an alternative implementation of the present disclosure in which a base wheel 342 is presented without a center post in the center hub 344 of the wheel 342. A removable center post 346 is provided that includes the post 348 and a plurality of legs 350 that are sized and shaped to be attached to the center hub 344. More particularly, there are five legs 350 (alternatively one leg attachment per lug on the vehicle), each having a foot 352 with an opening 354 sized and shaped to accommodate a fastener 356 that attaches the removable center post 346 to the center hub 344 of the wheel 342. Alternatively, the center post 346 can be attached to rotor lugs that extend through the base wheel 342 for concurrent attachment of both the base wheel 342 and the removable center post 346 to the rotor (not shown).

Figure 31:
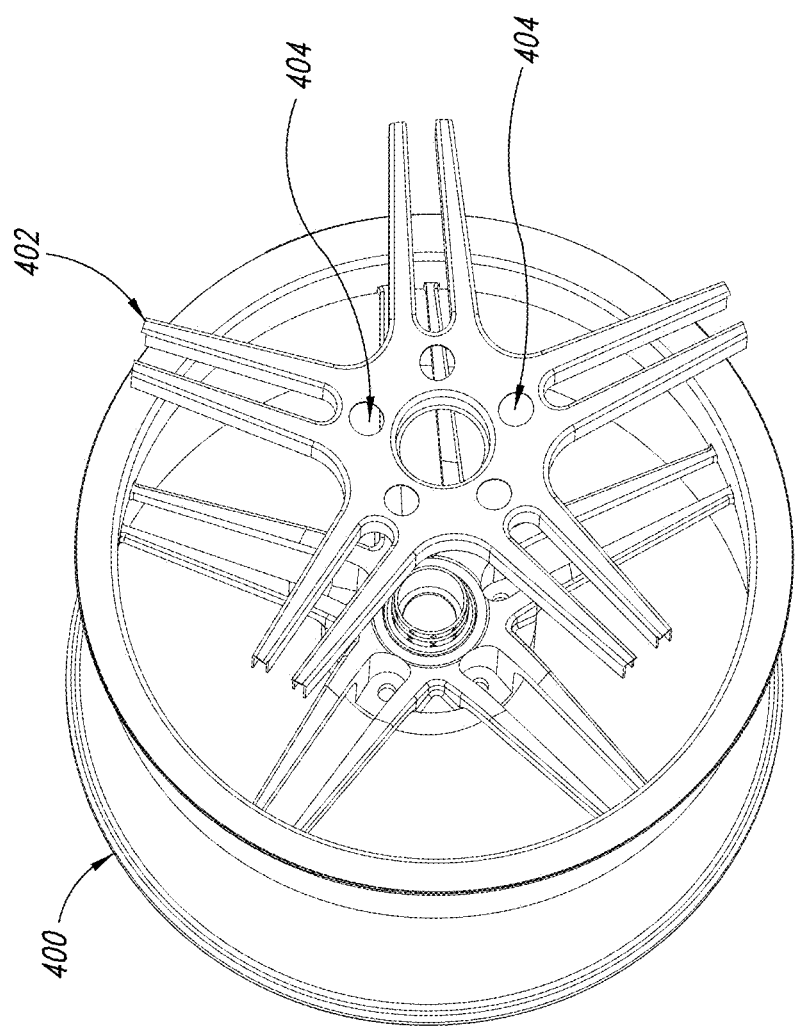
FIG. 31 is an axonometric exploded view of a base wheel with a five-spoked ornamental face that includes five lug through-holes for wheel lugs to pass through for an alternative look.
Figure 32:
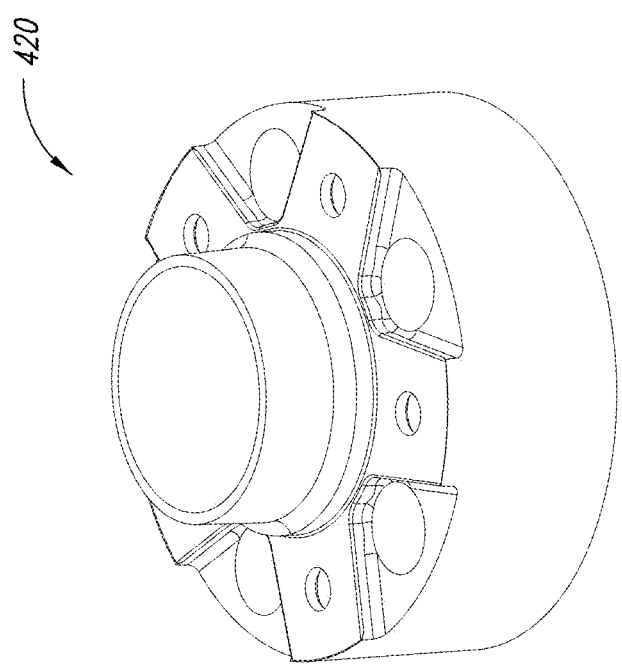
FIG. 32 is an axonometric illustration of a spacer formed in accordance with the present disclosure that attaches to the vehicle and to the wheel hub for spacing the base wheel from the vehicle that creates the center hub independently from the base wheel in an alternative method.

The various implementations described above can be combined to provide further implementations. For example, the ring can have channels that are sized and shaped to receive a component on the wheel and in which the ring then twists and locks in place on the wheel. FIG. 31 illustrates another alternative embodiment of a base wheel 400 with a five-spoked ornamental face 402 that includes five lug through-holes 404 for wheel lugs (not shown) to pass through for an alternative look. FIG. 32 illustrates yet another alternative embodiment in which a spacer 420 is provided for mounting on the vehicle and providing an attachment for the base wheels of the present disclosure. This spaces the base wheel and any attachments further out from the vehicle to provide a different look and handling for the vehicle. Aspects of the implementations can be modified, if necessary, to employ concepts of the various patents, applications and publications to provide yet further implementations.

For example, the ornamental face plate 32 can be provided with a locking mechanism (not shown) as one unit to lock in place on the post. This can include a snap-on version for ease of installation and removal.

Figure 33C:
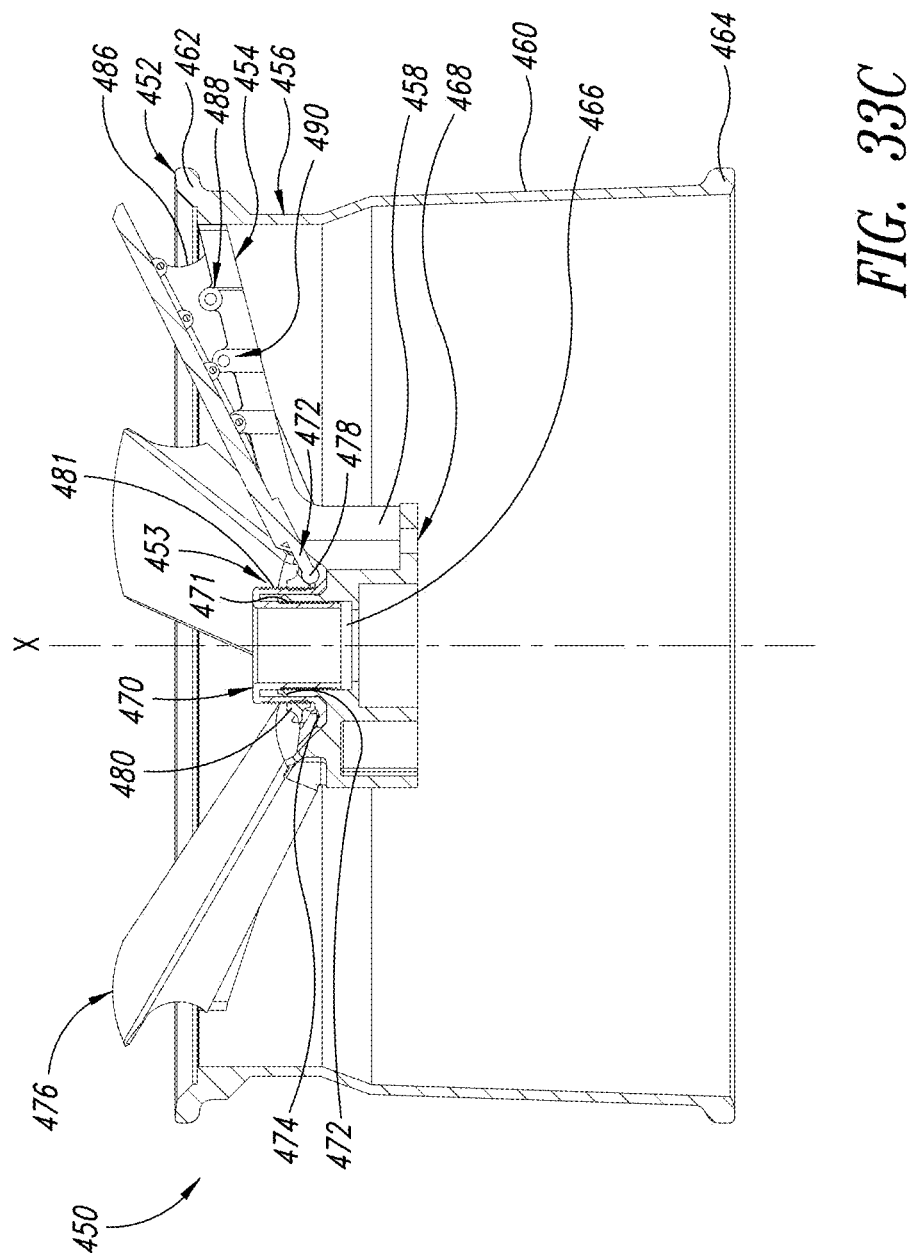

FIGS. 33A-33C are cross-sectional illustrations of another implementation of a wheel assembly 450 having a base wheel 452 with an attached adjustable depth ornamental assembly 453 at different stages of deployment. In this implementation, the ornamental assembly 453 can move axially with respect to the base wheel 452 to change the concavity between the base wheel 452 and the ornamental assembly 453 as described more fully below.

Figure 35:
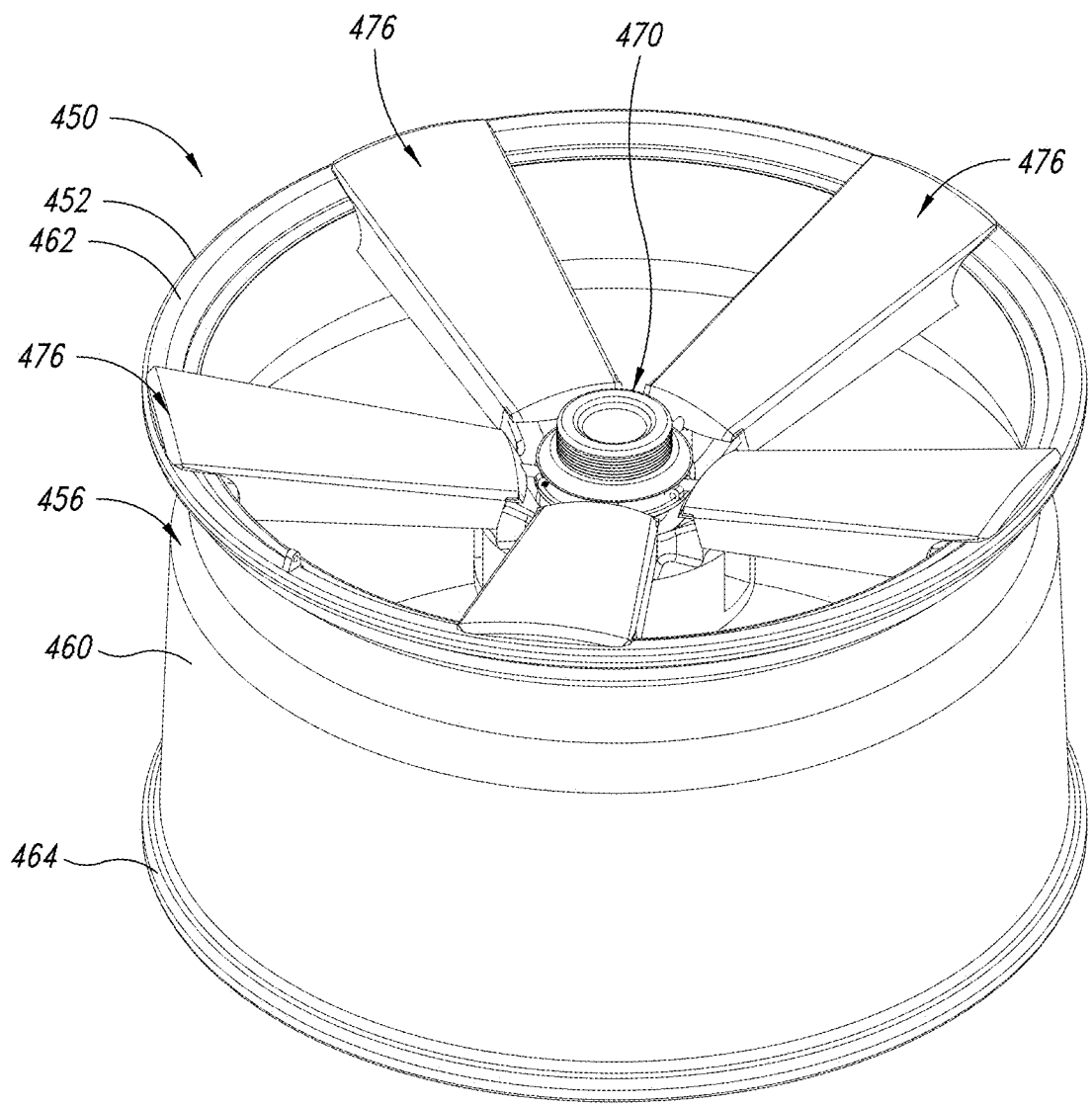
FIGS. 35-37 are axonometric projections of the entire base wheel and adjustable depth wheel assembly corresponding to the different deployment stages of FIGS. 33A-33C respectively.
Figure 36:
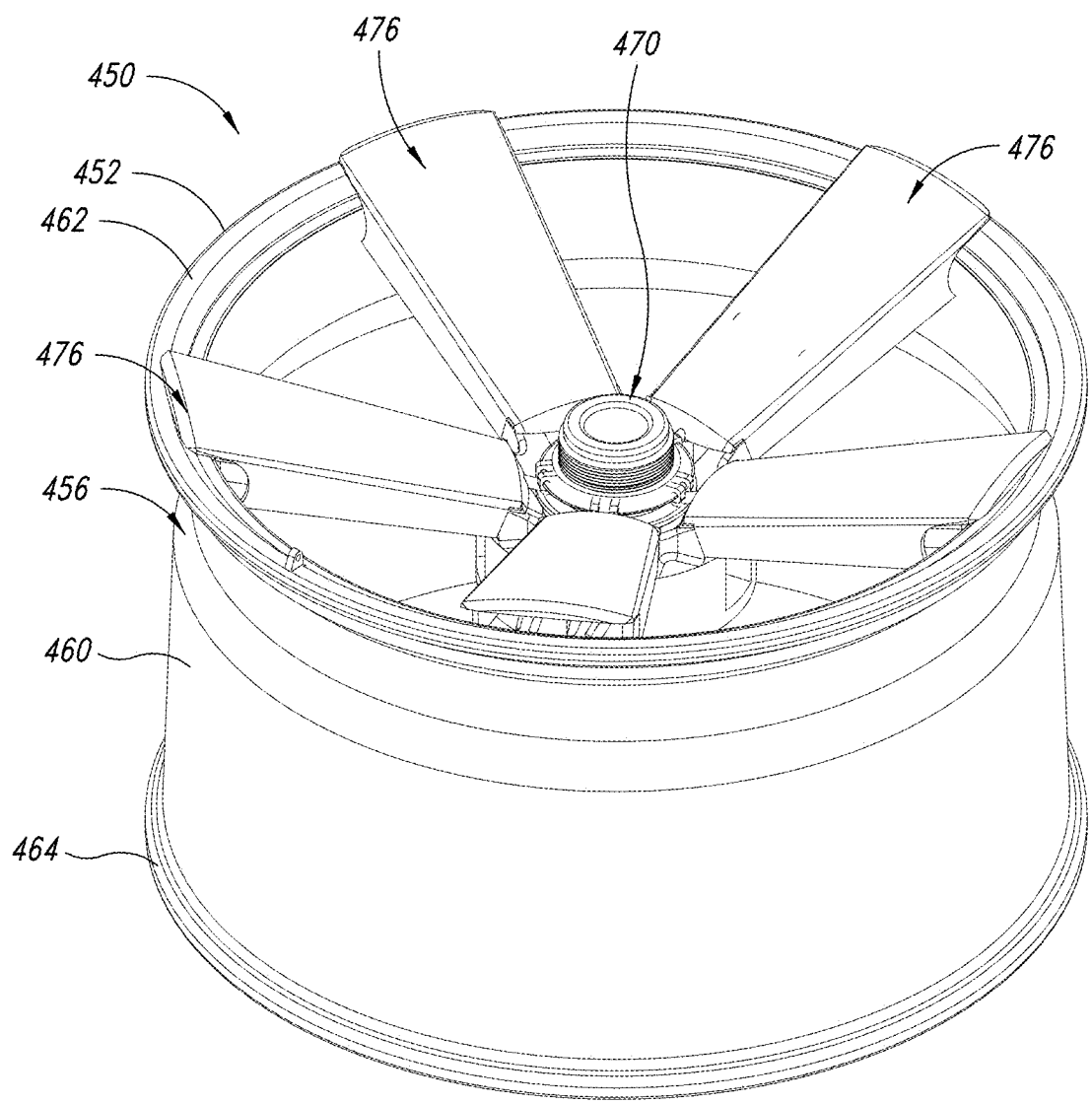
Figure 37:
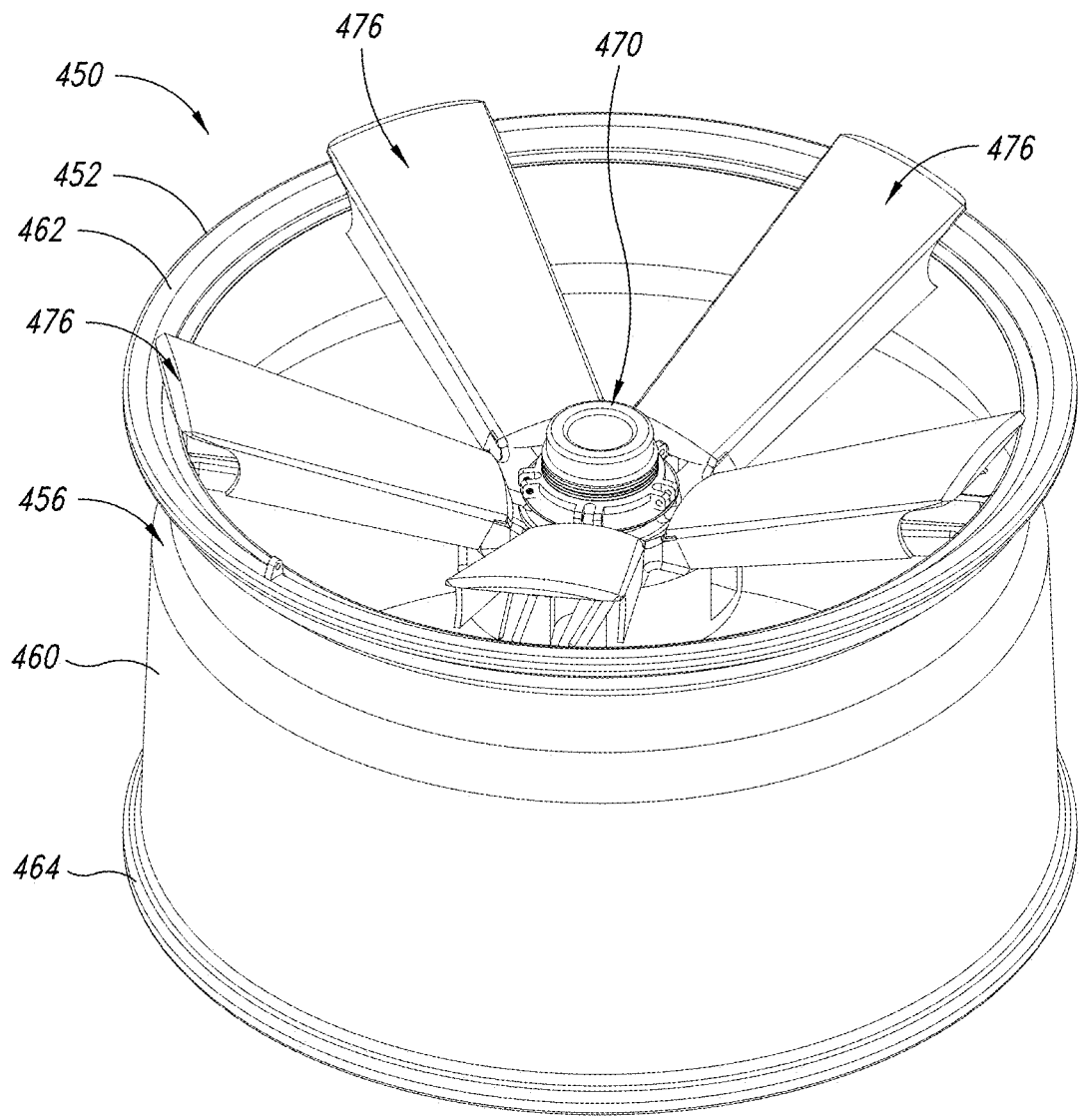

As shown in FIGS. 33A-33C and corresponding FIGS. 35-37, respectively, the base wheel 452 has five radial spokes 454, although more or less spokes may be used, fixedly attached or integrally formed with a barrel portion 456 at one end of the spokes 454 and a centrally located wheel hub 458 at the other end of the spokes 454, similar or identical to the base wheels described previously. The wheel hub 458 has a center attachment point 466 that is structured to engage the ornamental assembly 453 and enable the ornamental assembly 453 to move axially along a rotational axis X-X of the base wheel 452.

The barrel portion 456 of the base wheel 452 includes the cylindrical-shaped barrel 460 having an annular exterior rim 462 and an annular interior rim 464 formed around the exterior and interior perimeters of the barrel 460, respectively, of the barrel 456. The wheel hub 458 in this implementation is not solid from the exterior rim 462 but has the spokes 454 described above. However, it is to be understood that other configurations may be used, including solid dished, bladed, slotted, and variations thereof for weight reduction (to sustain the weight of the vehicle). The size, shape, and placement of these features are also determined by ornamental design considerations and to an appearance that has appeal to consumers based on latest styles and trends. Although the weight of the base wheel 452 is preferably as light as possible, removal of material to achieve lighter weight may still be done, with or without deference to appearance, cosmetic appeal, and latest ornamental trends and consumer preferences.

The wheel hub 458 has the center attachment point 466 that may be integrally formed with the wheel hub 458, such as in the forging implementations, or welded in place during fabrication, or it may be removably attached to the wheel hub 458 using conventional attachment methods that are readily commercially available and will not be described in detail herein. The center attachment point 466 includes five openings 468 sized and shaped to receive five mounting lugs projecting from the vehicle rotor as described above with respect to FIGS. 1-4.

The adjustable depth ornamental assembly 453 includes a center post 470 structured to attach to the center attachment point 466 to move axially along the X-X rotational axis of the base wheel 452. In one implementation, the center post 470 has a hollow cylindrical interior with a first set of external threads 471 sized and shaped to engage internal threads on the center attachment point 466. A locking screw (not shown) can be threadably engaged with a side wall of the center post 470 to bear against the center attachment point 466 and prevent rotation of the center post 470 relative to the center attachment point 466. Threading the center post 470 clockwise onto the center attachment point 466 changes the position of the center post 470 relative to the base wheel 452 by moving it deeper into the interior of the base wheel 452 (unless reverse threads are used, then the opposite would be true). Likewise, turning the center post counterclockwise would move the center post in the opposite direction so it would move to be more shallow in the interior of the base wheel 452.

Figure 34:
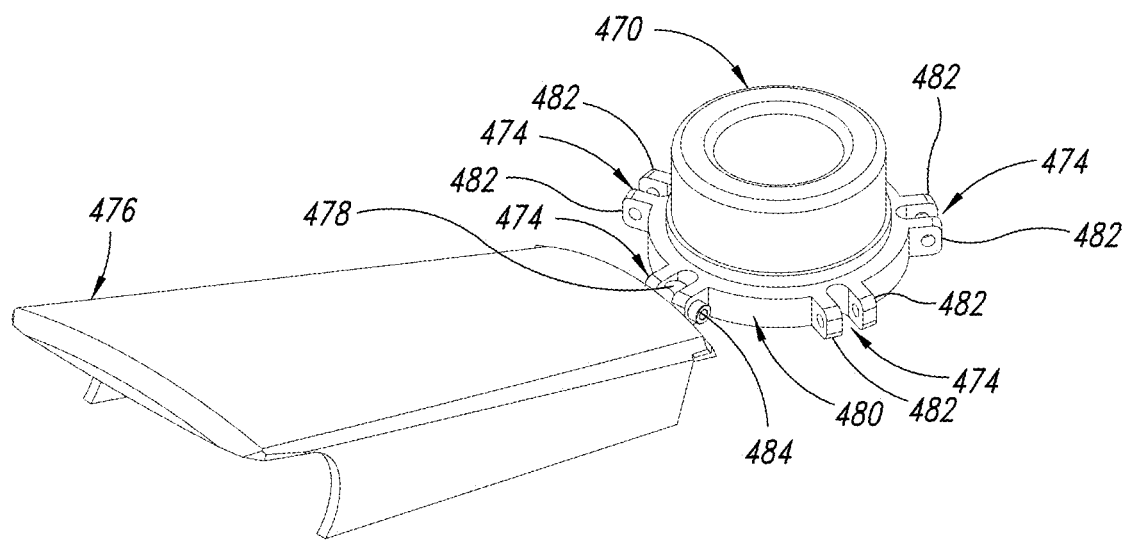
FIG. 34 is an axonometric projection of a portion of the adjustable depth ornamental assembly of FIGS. 33A-33C.

Attached at radially spaced attachment points on the exterior of the center post 470 are arms 472, each arm 472 attached to a yoke 474 at a proximal end of the arm 472. Attached for pivotal movement to each respective yoke 474 are spoke covers 476 that are sized and shaped to cover the exterior face of the base wheel spokes 454, providing an ornamental appearance to the base wheel spokes 454. Each spoke cover 476 includes a ball 478 at a proximal end of the arm 472 of the spoke cover 476 that is fit into the yoke 474, and can be held in place with a fastener 484 as shown in FIG. 34. FIG. 34 illustrates the yokes 474 that extend from a ring 480 that is attachable attached to a second set of exterior threads 481 on the center post 470. The ball 478 can be seen positioned between two legs 482 of the respective yoke 474 and held in place with the fastener 484 that also serves as an axle on which the spoke cover 476 pivots.

The underside of each spoke cover 476 includes an alignment rib 486 positioned along a longitudinal axis of the spoke cover 476, generally extending along the mid-section of the spoke cover 476. The rib 486 includes a plurality of axially spaced semicircular slots 488 that are sized and shaped to fit over corresponding alignment projections 490 on the surface of the respective base wheel spoke 454. As shown in FIGS. 33A-33C, there are three slots 488 and three projections 490, although it is to be understood that more or less than three may be used.

In FIGS. 33A and 35, the ornamental assembly is positioned to be a shallow depth within the interior of the base wheel 452. In FIGS. 33B and 36, the ornamental assembly is positioned at an intermediate depth, and in FIGS. 33C and 37, the ornamental assembly is at its deepest depth within the interior of the base wheel 452.

Figure 38:
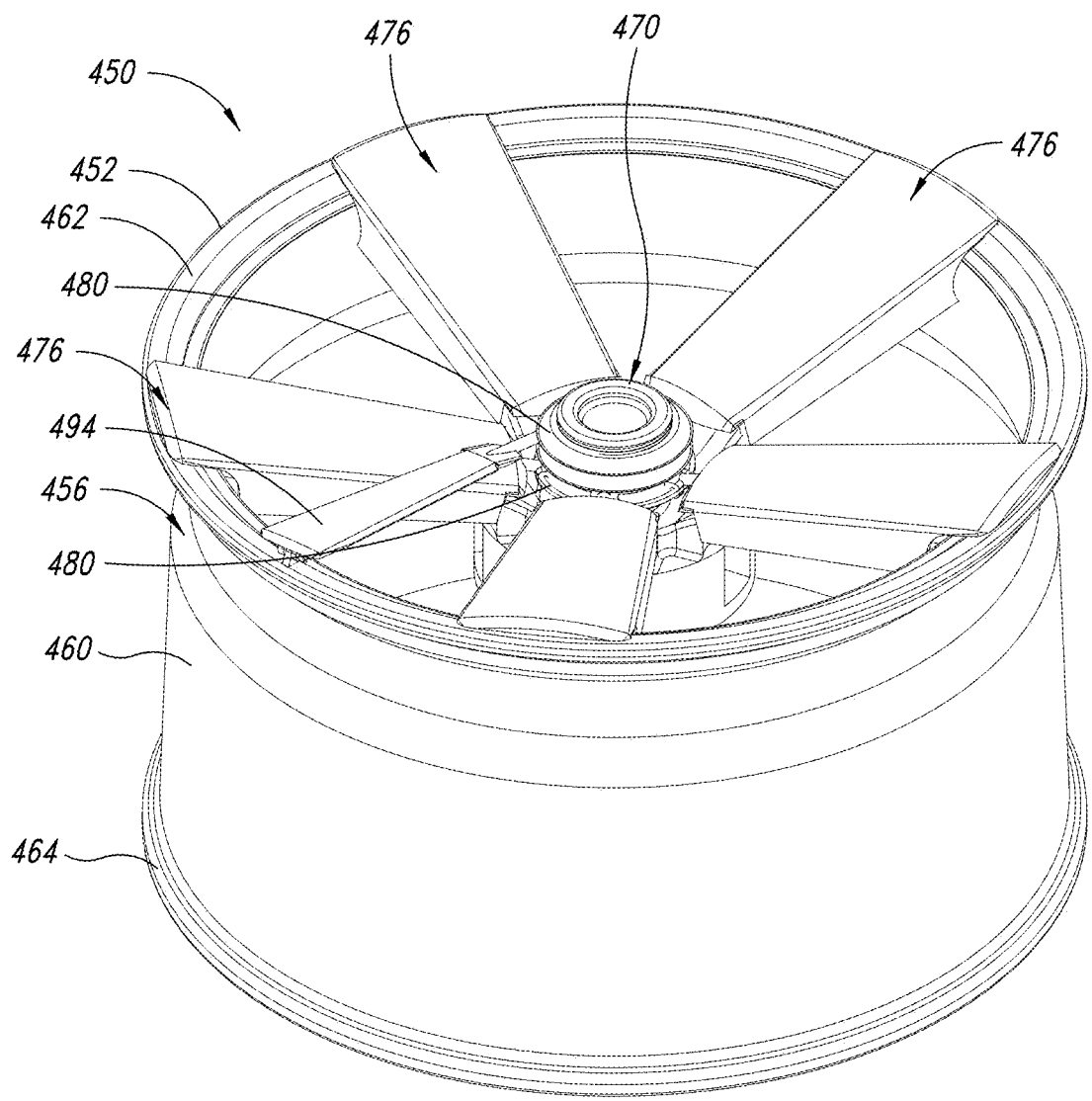
FIG. 38 is an axonometric projection that illustrates another embodiment of the base wheel with a bi-level adjustable depth wheel assembly formed in accordance with the present disclosure.

FIG. 38 is an axonometric projection that illustrates another embodiment of the base wheel with a bi-level adjustable depth wheel assembly 492. In this implementation another set of ornamental spokes 494 can be used with the center post 470 having an additional ring 480 on which the second set of ornamental spokes 494 can be mounted for pivotal movement. As shown in FIG. 38, the spokes 476 and the ornamental spokes 494 each having distal ends configured to bear against the exterior rim 462 of the wheel barrel 460, despite the spokes 476, 494 each being attached at different depths along center post 470 along the axis of rotation of the wheel. Such a configuration is achievable by way of the varying angles of the respective ornamental spokes 476, 494 relative to the interior of the wheel barrel.

Another feature and benefit of the present disclosure is the ability to leave open windows or spaces in the barrel of the base wheel, with or without the use of ornamental face plates, as described herein, to allow for visualization and cooling of brake components, or just cooling of vehicle components.

These and other changes can be made to the implementations in light of the above detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A wheel assembly for use on a vehicle, the wheel assembly comprising:
   a barrel having a sidewall with an internal surface that circumscribes a hollow interior having a first end and a second end and a rotational axis about which the barrel rotates, the sidewall having an outboard flange;
   a hub located in an interior of the barrel and having an exterior side and an interior side that is capable of coupling the barrel to the vehicle, the hub having an attachment mechanism point formed along a longitudinal axis of the hub;

a plurality of barrel spokes extending from the hub and terminating at the barrel; and an ornamental face plate sized and shaped to be removably coupled directly to the hub to cover at least a portion of the hub and a portion of the interior surface of the barrel on the exterior side of the hub, the ornamental face plate including a plurality of ornamental spokes that are structured to be received over the barrel spokes, two or more ornamental spokes of the plurality of ornamental spokes each having a distal end configured to bear against a distal rim of the barrel, the ornamental face plate selected from a plurality of ornamental face plates, the plurality of ornamental face plates each configured to cooperate with the attachment mechanism on the hub such that each ornamental face plate of the plurality of ornamental face plates is positioned at different positions along the rotational axis of the barrel to create different angles between respective ornamental spokes and the barrel.

2. The wheel assembly of claim 1, further comprising a center attachment device with a post that is capable of attachment to the hub.

3. The wheel assembly of claim 1 wherein the hub is offset along the rotational axis of the barrel towards the first end of the barrel.

4. The wheel assembly of claim 1 wherein the barrel spokes form windows or spaces in the barrel to enable cooling of components on the vehicle or visualization of components on the vehicle, or both cooling and visualization, and wherein the ornamental spokes each have a proximal end coupled for articulated movement to the attachment point on the hub and the distal end coupled for articulated movement on a respective barrel spoke to enable the ornamental spoke to remain attached to the hub and the barrel spoke during positioning of the ornamental face plate on the attachment mechanism on the hub.

5. The wheel assembly of claim 1, further comprising an ornamental ring sized and shaped to be received on the barrel and held in place against the barrel by the distal ends of the ornamental spokes of the ornamental face plate.

6. The wheel assembly of claim 5 wherein the ornamental ring is attachable to the barrel and includes a plurality of radially arranged slots, and further wherein the distal end of each ornamental spoke includes at least one side wall that is sized and shaped to be received within a respective radially arranged slot in the ornamental ring.

7. The wheel assembly of claim 5 wherein each ornamental spoke includes an opening formed in the distal end, and further wherein the ornamental ring is attachable to the barrel and includes a plurality of tabs arranged around a circumference of the ornamental ring, each tab sized and shaped to be received within the respective opening in the distal end of each ornamental spoke.

8. The wheel assembly of claim 1 wherein the ornamental face plate includes a distal ring circumscribing the ornamental face plate and supported by the distal ends of the ornamental spokes, the distal ring sized and shaped to engage the outboard flange of the barrel.

9. A vehicle, comprising:
a wheel assembly for use on a vehicle, the wheel assembly comprising:
a barrel having a sidewall with an internal surface that circumscribes a hollow interior having a first end and a second end and a rotational axis about which the barrel rotates, the sidewall having an outboard flange;

a hub located in an interior of the barrel and having an exterior side and an interior side that is capable of coupling the barrel to the vehicle, the hub having an attachment mechanism formed along a longitudinal axis of the hub;

a plurality of barrel spokes extending from the hub and terminating at the barrel; and at least one ornamental face plate sized and shaped to be removably coupled directly to the hub to cover at least a portion of the hub and a portion of the interior surface of the barrel on the exterior side of the hub, the at least one ornamental face plate including a plurality of ornamental spokes that are structured to be received over the barrel spokes, two or more ornamental spokes of the plurality of ornamental spokes each having a distal end configured to bear against a distal rim of the barrel, the at least one ornamental face plate selected from a plurality of ornamental face plates, the plurality of ornamental face plates each configured to cooperate with the attachment mechanism on the hub, such that each ornamental face plate of the plurality of ornamental face plates is positioned at different positions along the rotational axis of the barrel to create different angles between respective ornamental spokes and the barrel.

10. The vehicle of claim 9, further comprising a center attachment device with a post that is capable of attachment to the hub.

11. The wheel assembly of claim 10 wherein the center attachment device comprises a lock mechanism to lock the at least one ornamental face plate to the hub.

12. The wheel assembly of claim 9 wherein the hub is offset along the rotational axis of the barrel towards the first end of the barrel.

13. The wheel assembly of claim 9 wherein the barrel spokes form windows or spaces in the barrel to enable cooling of components on the vehicle or visualization of components on the vehicle, or both cooling and visualization, and wherein the ornamental spokes each have a proximal end coupled for articulated movement to the attachment point on the hub and the distal end coupled for articulated movement on a respective barrel spoke to enable the ornamental spoke to remain attached to the hub and the barrel spoke during positioning of the at least one ornamental face plate on the attachment mechanism on the hub.

14. The wheel assembly of claim 9, further comprising an ornamental ring sized and shaped to be received on the barrel and held in place against the barrel by the distal ends of the ornamental spokes of the at least one ornamental face plate.

15. The wheel assembly of claim 14 wherein the ornamental ring is attachable to the barrel and includes a plurality of radially arranged slots, and further wherein the distal end of each at least one ornamental spoke includes at least one side wall that is sized and shaped to be received within a respective radially arranged slot in the ornamental ring.

16. The wheel assembly of claim 14 wherein each at least one ornamental spoke includes an opening formed in the distal end, and further wherein the ornamental ring is attachable to the barrel and includes a plurality of tabs arranged around a circumference of the ornamental ring, each tab sized and shaped to be received within the respective opening in the distal end of each ornamental spoke.

17. The wheel assembly of claim 9 wherein the at least one ornamental face plate includes a distal ring circumscribing the at least one ornamental face plate and supported by the distal ends of the ornamental spokes, the distal ring sized and shaped to engage the outboard flange of the barrel.

18. The wheel assembly of claim 9 wherein the at least one ornamental face plate is structured to be supported by one or more of the barrel and the plurality of spokes.

\* \* \* \* \*